US009091606B2

(12) United States Patent
Fitz-Coy et al.

(10) Patent No.: US 9,091,606 B2
(45) Date of Patent: Jul. 28, 2015

(54) SYSTEM AND METHOD FOR ASSESSING THE PERFORMANCE OF AN ATTITUDE CONTROL SYSTEM FOR SMALL SATELLITES

(71) Applicant: UNIVERSITY OF FLORIDA RESEARCH FOUNDATION, INC., Gainesville, FL (US)

(72) Inventors: Norman G. Fitz-Coy, Gainesville, FL (US); Vivek Nagabhushan, Gainesville, FL (US)

(73) Assignee: University of Florida Research Foundation, Inc., Gainesville, FL (US)

( * ) Notice: Subject to any disclaimer, the term of this patent is extended or adjusted under 35 U.S.C. 154(b) by 0 days.

(21) Appl. No.: 13/740,728

(22) Filed: Jan. 14, 2013

(65) Prior Publication Data
US 2013/0125667 A1  May 23, 2013

Related U.S. Application Data

(63) Continuation-in-part of application No. 13/809,665, filed as application No. PCT/US2011/043128 on Jul. 7, 2011.

(60) Provisional application No. 61/364,264, filed on Jul. 14, 2010.

(51) Int. Cl.
*G01C 21/18* (2006.01)
*G01C 21/10* (2006.01)
*G01L 3/04* (2006.01)
(Continued)

(52) U.S. Cl.
CPC ............... *G01L 3/04* (2013.01); *B64F 5/0045* (2013.01); *B64G 1/286* (2013.01); *B64G 7/00* (2013.01); *G01L 3/00* (2013.01)

(58) Field of Classification Search
USPC ............................. 73/1.01, 862.041; 74/5.34
See application file for complete search history.

(56) References Cited

U.S. PATENT DOCUMENTS 2,933,267 A * 4/1960 Slater et al. ............... 73/503
3,050,995 A * 8/1962 Dozier, Jr. ............... 73/178 R
(Continued)

FOREIGN PATENT DOCUMENTS

JP          6-64599         3/1994
WO      WO-2010/135421     11/2010

OTHER PUBLICATIONS

Agrawal, B. N., et al.; "*Air Bearing Based Satellite Attitude Dynamics Simulator for Control Software Research and Development;*" Proceedings of SPIE, vol. 4366; dated 2001.
(Continued)

*Primary Examiner* — Lisa Caputo
*Assistant Examiner* — Octavia Hollington
(74) *Attorney, Agent, or Firm* — Alston & Bird LLP

(57) ABSTRACT

Various embodiments of the present invention include systems and methods for assessing the performance of an actuator of an attitude control system (ACS), such as a control moment gyroscope (CMG). In one embodiment, a system includes a support bracket assembly coupled to an actuator, wherein the actuator is configured to generate an output torque. The system also includes at least one sensor assembly that includes a sensor configured to measure the output torque about at least one axis of the support bracket assembly while the support bracket assembly remains substantially motionless.

16 Claims, 17 Drawing Sheets

(51) Int. Cl.
- *B64G 1/28* (2006.01)
- *B64G 7/00* (2006.01)
- *B64F 5/00* (2006.01)
- *G01L 3/00* (2006.01)

(56) References Cited

U.S. PATENT DOCUMENTS

| | | | |
|---|---|---|---|
| 3,164,978 A * | 1/1965 | Sharman et al. | 73/1.77 |
| 3,931,747 A | 1/1976 | Erspamer | |
| 4,573,651 A | 3/1986 | Stanton | |
| 5,433,123 A | 7/1995 | Hofmann et al. | |
| 5,754,295 A | 5/1998 | Mitchell | |
| 7,089,672 B2 | 8/2006 | Noltemeyer | |
| 7,739,923 B2 | 6/2010 | Nogami et al. | |
| 7,890,272 B2 | 2/2011 | Umezawa | |
| 8,072,176 B2 | 12/2011 | Ueda | |

OTHER PUBLICATIONS

Bruns, T., et al.; "*Traceability of Dynamic Force and Torque Calibrations by Means of Laser Doppler Interferometry*;" Sixth International Conference on Vibration Measurements by Laser Techniques: Advances and Applications; dated Jun. 22, 2004 <http://proceedings.spiedigitallibrary.org/proceeding.aspx?articleid=848694>.

Buyanov, E. V.; "*Device for measuring the inertia tensor of a rigid body*;" Measurement Techniques; vol. 34, No. 6; pp. 585-589; dated 1991.

Fedor, J. V., et al.; "*Explorer XXXV attitude control system*;" NASA TN D-5187; NASA; dated Jun. 1969; retrieved on Feb. 6, 2013 from <https://docs.google.com/viewer?a=v
&q=cache:Is9QoCctHjYJ:ntrs.nasa.gov/archive/nasa/casi.ntrs.nasa.gov/19690017890_1969017890.
pdf+Explorer+XXXV+attitude+control+system&hl=en&gl=us
&pid=bl&srcid=ADGEESh1tV14YnGpKCvLog0Hdx1rJEBW
MU2Os5-b77rk9mSrLkcIF-SoNIJkNW8HiyS00XSbJa2LTZM
8HeRTIBKhGErUPD_Kn-fV8RpOHetjjPbDj7IIXgDglu
LnPtjSsEarJJOcgRh_&sig=AHIEtbT9bTpwsPwL3Y81
FhujxwMZKNk8Ug>.

International Search Report and Written Opinion of the International Searching Authority for Application No. PCT/US2011/043128; dated Feb. 21, 2012.

Jung, D., et al.; "*A 3-DoF experimental Test-Bed for Integrated Attitude Dynamics and Control Research*;" AIAA Guidance, Navigation, and Control Conference, AIAA 2003-5331; dated 2003; retrieved on Jan. 31, 2013 from <http://www.google.com/#hl=en
&tbo=d&output=search&sclient=psy-ab&q=A+3-
DpF+experimental+Test-
Bed+for+Integrated+Attitude+Dynamics+and+Control+Research
&oq=A+3-DpF+experimental+Test-
Bed+for+Integrated+Attitude+Dynamics+and+Control+Research
&gs_l= hp.3...1440.1440.0.1958.1.1.0.0.0.0.62.62.1.1.0.1es%3B..
0.0...1c.1.RBGsNem6R-I&pbx=1 &bav=on.2,or.r_gc.r_pw.r_qf.
&bvm=bv.41642243,d.dmg&fp=b20401a641aa2e02&biw=1385
&bih=666>.

Kim, J., et al.; "*Automatic Mass Balancing of Air-Bearing Based Three-Axis Rotational Spacecraft Simulator*;" AIAA Journal of Guidance, Control and Dynamics, vol. 32, No. 3; dated May-Jun. 2009; pp. 1005-1017; retrieved on Jan. 31, 2013 from < http://www.google.com/url?sa=t&rct&q=automatic%20mass%20balancing%
20of%20air-bearing%20based%20three-axis%20rotational%
20spacecraft%20simulator&source=web&cd=1&ved=
0CDIQFjAA&url=http%3A%2F%2Fwww.nps.
edu%2FAcademics%2FCenters%2FSRDC%2FDocs%2FAIAA-
34437-264-kim_agrawal.pdf&ei=4pgKUYv7FI_J0AHF_
oGwBw&usg=AFQjCNHEMTCPdap3 WffyRxFP0Qfio4Wxig
&bvm=bv.41642243,d. dmQ>.

Kurukowa, H.; "*A Geometric Study of Control Moment Gyroscopes*;" PhD Thesis, University of Tokyo; dated 1998.

Kwangmok, J., et al.; "*A Self-Sensing Dielectric Elastomer Actuator*;" Sensors and Actuators A: Physical, vol. 143, No. 2; dated May 16, 2008; pp. 343-351; <http://www.sciencedirect.com/science/article/pii/ S092442470700814X>; retrieved on Jan. 31, 2013 from <http://www.google.com/url?sa=t&rct=j&q=a%20self-
sensing%20dielectric%20elastomer%20actuator&source=web&
cd=3&ved=0CEUQFjAC&url=http%3A%2F%2F144.206.159.
178%2Fft%2FCONF%2F16413491%2F16413545.pdf
&ei=1rQKUaytFoXy0QG_koHoDA
&usg=AFQjCNFwA2KJ2EFqGva2Tsrw9d8j6NKvWw&bvm=bv.
41642243,d.dmQ>.

Nagabhushan, V., et al.; "*Architecture for Unconstrained 3-Axis Attitude Determination and Control Test Bed*;" 21st AIAA/AAS Space Flight Mechanics Conference; dated 2011.

Nagabhushan, V.; "*Development of Control Moment Gyroscopes for Attitude Control of Small Satellites*;" Master Thesis, University of Florida; dated 2009; retrieved on Jan. 31, 2013 from <etd.fcla.edu/UF/UFE0025032/nagabhushan_v.pdf>.

Nagabhushan, V., et al.; "*Scalable, HIL, Unconstrained 3-Axis Test Bed for Attitude Control Systems*;" AAS Astrodynamics Specialist Conference; dated 2010.

Nagabhushan, V., et al.; "*Split Flywheel Design With Attitude Jitter Minimization Through Flywheel Phase Control*;" AIAA@Infortech; vol. 3 dated Apr. 2009.

Nagabhushan, V.; "*SwampSat Test Report 10A1TD0207*;" Space Systems Group; University of Florida; dated 2010 (unpublished).

Parkin, S., et al.; "*Optical Measurement of Torque Exerted on an Elongated Object by a Noncircular Laser Beam*:" Phys. Rev. A, vol. 70, No. 2; dated Aug. 4, 2004<http://pra.aps.org/abstract/PRA/v70/i2/e023816>; retrieved on Jan. 31, 2013 from <arxiv.org/pdf/physics/0403008>.

Prado, J., et al.; "*Three Axis Air-Bearing Based Platform for Small Satellite Attitude Determination and Control Simulation*;" Journal of Applied Research and Technology, vol. 3, No. 3; dated Dec. 2005; pp. 222-237.

Schwartz, J. L., et al.; "*Historical Review of Air-Bearing Spacecraft Simulators*;" Journal of Guidance, Control and Dynamics, vol. 26, No. 4; dated 2003; pp. 513-522.

Woo, H., et al.; "*CubeSat Three Axis Simulator(CubeTAS)*;" AIAA Modeling and Simulation Technologies Conference; dated 2011.

\* cited by examiner

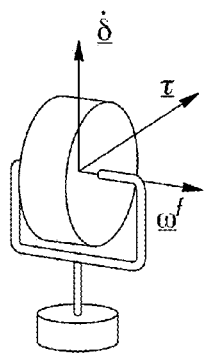 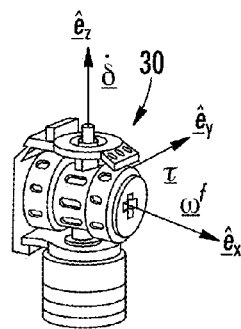 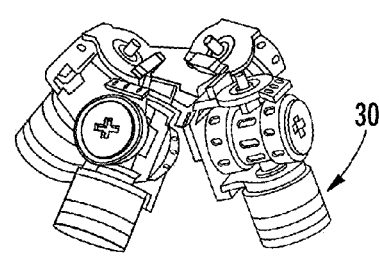
FIG. 4A     FIG. 4B     FIG. 4C
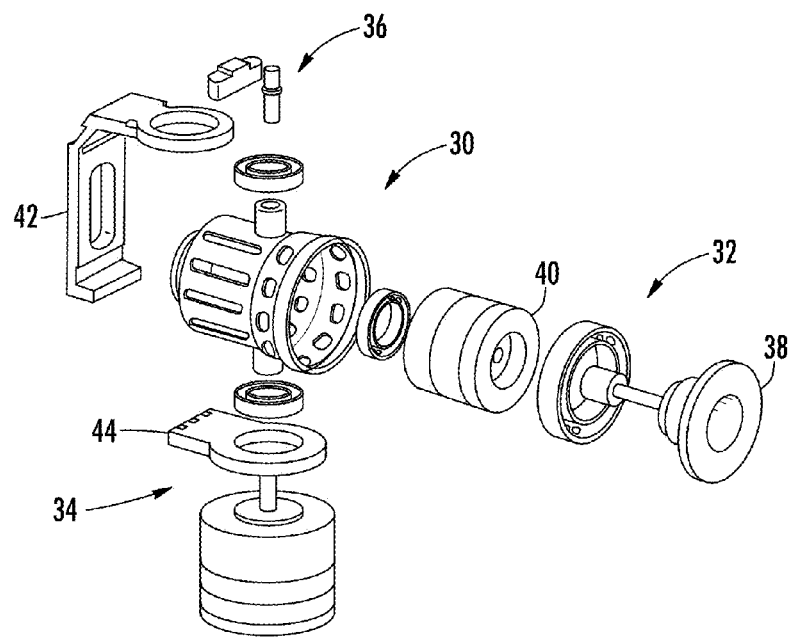
FIG. 5

SYSTEM AND METHOD FOR ASSESSING THE PERFORMANCE OF AN ATTITUDE CONTROL SYSTEM FOR SMALL SATELLITES

CROSS-REFERENCE TO RELATED APPLICATIONS

The present application is a continuation-in-part application of U.S. Non-provisional application Ser. No. 13/809,665, entitled "System and Method for Assessing the Performance of an Attitude Control System for Small Satellites," filed Jan. 11, 2013, which is a national-phase entry of International Application No. PCT/US2011/043128, entitled "System and Method for Assessing the Performance of an Attitude Control System for Small Satellites," filed Jul. 7, 2011, which claims priority to U.S. Provisional Application No. 61/364,264, entitled "System and Method for Assessing the Performance of an Attitude Control System for Small Satellites," filed Jul. 14, 2010, the contents of each are hereby incorporated by reference in their entireties.

FIELD OF THE INVENTION

Embodiments of the present invention relate to satellites and, more particularly, to systems and methods for assessing the performance of an attitude control system for small satellites.

BACKGROUND

During the past decade there has been growing interest within the space industry towards the development of small satellites. Small satellites are typically categorized as picosats (1 kg or less), nanosats (1-10 kg), microsats (10-100 kg) or minisats (100-500 kg) and range in size from softballs to refrigerators. The interest in these satellites is driven by the current constraints of traditional satellites and launch systems. As a result, there has been a significant effort to push satellite technology to smaller sizes and mass, which would enable small satellites to accomplish missions to complement the larger satellites. Examples of such missions include imaging, remote sensing, surveillance, disaster management, and blue force tracking. These missions are achieved by payloads which demand pointing capabilities from the satellites. This requires an attitude control system (ACS) with small actuators that can fit into the volume and mass constraints of small satellites.

The two major components of the ACS are the actuator and the control algorithm. Various types of actuators include the reaction wheel, magnetic rods, torque coils, thrusters, momentum wheels, and control moment gyroscope (CMG). CMGs rotate the angular momentum along a flywheel axis about a gimbal axis to produce a gyroscopic control torque as shown in FIG. 4(a). The output torque (gyroscopic torque) is amplified over the input torque required to rotate the gimbal axis (due to the satellite angular velocity) resulting in the well-known torque amplification factor which allows for higher slew rates. This property of torque amplification as well as the fact that CMGs require minimal shaft power, permits the CMG to have a much higher torque per unit mass and unit power ratio than RWs.

More specifically, the CMG is a mechanism that produces torque by a combination of two motions—spinning a flywheel about an axis referred to as the flywheel axis and the rotation of the spinning flywheel about an axis perpendicular to flywheel axis referred to as the gimbal axis. The two main components of a gyroscope are the flywheel and the gimbal. The flywheel is a spinning rotor with inertia sufficient to provide the desired angular momentum; the gimbal is a pivot about which the flywheel assembly can be rotated. The magnitude of the gyroscopic torque produced is directly proportional to the inertia of the flywheel, the angular speed of the flywheel and the rate of rotation of the gimbal. In a CMG, the inertia of the flywheel and the speed of the flywheel are constant, and the torque output is controlled by changing the rotation rate of the gimbal. The direction of the torque produced is perpendicular to both the flywheel and the gimbal axes per the right hand rule. This torque acts on the satellite structure to change its attitude. A combination of gyroscopes is used to produce a net torque in the desired direction and magnitude. There are various combinations of gyroscopes that can be used depending upon the mission requirements (box configuration, inline configuration, roof top configuration, pyramidal configuration).

Apart from the gyroscopic torque produced by the CMG, there are other torques that arise from the motion of the flywheel and gimbal that contribute to the dynamics of the satellite:
  Reaction torque due to friction in the flywheel bearings.
  Reaction torque due to the acceleration of the gimbal; this torque depends on the angular acceleration and the inertia of the gimbal.
  Reaction torque due to the friction of the gimbal bearings and slip ring.

The motion to the flywheel and gimbal is provided by flywheel and gimbal motors. There are feedback devices (e.g., encoders and Hall-effect sensors) for sensing the angular speed and position. A slip ring is provided for continuous power supply to the flywheel motor for endless rotation of the gimbal. All these hardware are assembled together with structural components.

The output torque of the actuator is used to evaluate its performance. Certain kinds of actuators that use momentum from spinning wheels to generate torque are prone to disturbances due to misalignments and non-homogeneity of the wheels. This disturbance is termed as jitter. These actuators which contain wheels are evaluated for torque output and jitter as their performance metrics. Although there exists test beds that can evaluate the performance of large actuators, there has not been to date, an instrument to determine the performance of miniature actuators (<5 Nmm torque capacity).

ACSs are one of the most challenging spacecraft sub-systems for hardware performance verification and validation. Testing of ACSs pose many challenges as it requires simulation and control of spacecraft response to actuator inputs. Traditionally, this has been achieved using a motion platform that has three rotational degrees-of-freedom (dof) to emulate the spacecraft's attitude motion. ACS test beds developed to date for various institutions (e.g., Georgia Tech, NPS, Honeywell, AFRL to name a few) are typically for large spacecraft (>500 kg) and all, without exception, are suspension-based systems using air bearings[1]. Although these test beds have provided a means to validate 3-axis attitude control systems, they are limited in their testing capabilities and have several disadvantages. For example, ACS test beds using air bearings have limited range of motion about the pitch and roll axes (about ±30°)[2], rendering the tests of continuous large angle maneuvers impossible. These test beds also have limits on their rotational rates as the centrifugal forces due to rotation have to be less than the dynamic capacity of the air bearing, i.e., these test beds limit the angular velocity of the simulated spacecraft thus preventing rapid retargeting maneuvers. Additionally, in order to nullify the bias torque due to gravity, these test beds require an additional dynamic mass balancing system which requires a separate control system[3]. The reactions due to the movement of the balancing masses induce unwanted disturbances to the spacecraft dynamics. There are additional effects/disturbances due to gravity sag associated with the size of these structures, viscous drag of the atmosphere, and the air draft from clean room blowers. Another major shortcoming of these test beds is that they cannot be used to test in an environmental chamber (thermal/vacuum) due to their complex nature and their dependency on air bearing. It is hence impossible to characterize the operational performance of the system under test in a representative space environment. FIG. 1(a) shows the schematic of a conventional test bed in which all the necessary hardware has to be integrated onto the air bearing platform. It should be noted that due to the platform's motion, an attitude determination system (ADS) is required onboard the air bearing test bed. ACS test beds for small satellites pose even harder challenges since they are more prone to viscous drags and other environmental disturbances due to their small inertia. Furthermore, it is difficult to incorporate a mass balancing system within the mass and inertia limits of these test beds. While there have been efforts in development of control strategies and actuators, there has been no transformative effort in the testing methods of attitude control system for the past fifty years[1]. There are currently no such test beds available for small satellites, especially for the pico (1 kg) and nano (10 kg) class.

Therefore, there exists a need for a system and method for assessing the performance of ACSs for satellites (e.g., pico and nano-satellites). It would be further advantageous for a system and method for assessing the performance of a CMG.

BRIEF SUMMARY OF THE INVENTION

Embodiments of the present invention are directed to systems and methods for assessing the performance of actuators for attitude control of satellites, such as small satellites (e.g., pico and nano-satellites). In one embodiment, a system includes a support bracket assembly coupled to an actuator (e.g., a CMG), wherein the actuator is configured to generate an output torque. The system also includes at least one sensor assembly coupled to the support bracket assembly, wherein the at least one sensor assembly includes a sensor configured to measure an output torque of the actuator about at least one axis of the support bracket assembly (e.g., a pitch or a roll axis) while the support bracket assembly remains substantially motionless. For example, the support bracket assembly is configured to deflect less than about 30 arc minutes while the sensor measures the output torque about the at least one axis. In another embodiment, the system is configured to measure the output torque about a plurality of axes of the support bracket assembly (e.g., a pitch and a roll axis). The system may further include a data acquisition system in communication with the at least one sensor assembly and that is configured to receive the measured output torque.

According to aspects of the invention, the support bracket assembly includes a pitch axis gimbal coupled to the actuator. The support bracket assembly may further include a roll axis gimbal pivotably coupled to the pitch axis gimbal. The pitch axis gimbal may be mounted internally with respect to the roll axis gimbal. The pitch axis gimbal and the roll axis gimbal may extend in perpendicular planes with respect to one another (e.g., vertical and horizontal planes respectively). The sensor may be a pitch axis sensor coupled to the pitch axis gimbal and configured to measure torque on the pitch axis gimbal. The sensor assembly may further include a shaft extending through the roll axis gimbal and coupling the pitch axis gimbal and the pitch axis sensor. The sensor assembly may include a pitch axis sensor bracket coupled to the roll axis gimbal and configured to support the pitch axis sensor.

According to additional aspects, the sensor assembly includes a roll axis sensor coupled to the roll axis gimbal and is configured to measure torque on the roll axis gimbal. The support bracket assembly may further include a support bracket, wherein the roll axis gimbal is pivotably coupled to the support bracket. The at least one sensor assembly may also include a shaft extending through the support bracket and coupling the roll axis gimbal and the roll axis sensor. Furthermore, the sensor assembly may include a roll axis sensor bracket coupled to the support bracket and configured to support the roll axis sensor.

According to another embodiment, a method for assessing the performance of an actuator (e.g., a CMG) of an attitude control system is provided. The method includes coupling an actuator to a support bracket assembly and generating an output torque with the actuator. The method further includes coupling at least one sensor to at least a portion of the support bracket assembly. The method further includes measuring the output torque of the actuator about at least one axis of the support bracket assembly with the at least one sensor while the support bracket assembly remains substantially motionless. Aspects of the method include measuring the output torque of the actuator about each of a plurality of axes of the support bracket assembly (e.g., a pitch and a roll axis).

According to another embodiment, a system includes a support bracket assembly coupled to an actuator (e.g., a CMG), wherein the actuator is configured to generate an output torque. The system also includes at least one sensor assembly that includes a sensor configured to measure an output torque of the actuator about at least one axis of the support bracket assembly (e.g., a pitch or a roll axis) while the support bracket assembly remains substantially motionless. For example, the support bracket assembly is configured to deflect less than about 30 arc minutes while the sensor measures the output torque about the at least one axis. In another embodiment, the system is configured to measure the output torque about a plurality of axes of the support bracket assembly (e.g., a pitch axis and a roll axis). The system may further include a data acquisition system in communication with the at least one sensor assembly and that is configured to receive the measured output torque.

According to aspects of the invention, the support bracket assembly includes a pitch axis gimbal coupled to the actuator. The support bracket assembly may further include a roll axis gimbal pivotably coupled to the pitch axis gimbal. The pitch axis gimbal may be mounted internally with respect to the roll axis gimbal.

In some embodiments, the at least one sensor assembly comprises at least one torque sensor coupled to at least a portion of the support bracket assembly and configured to measure the output torque. According to other aspects, the sensor assembly includes at least one laser sensor configured to measure displacement of the pitch axis gimbal. The displacement of the pitch axis gimbal is representative of the output torque on the pitch axis gimbal. In another embodiment, the at least one sensor assembly further comprises a second laser sensor configured to measure displacement of the roll axis gimbal. The displacement of the roll axis gimbal is representative of the output torque on the roll axis gimbal.

In some embodiments, the at least one sensor assembly comprises a laser sensor configured to measure displacement of at least a portion of the support bracket assembly, wherein the displacement of the portion of the support bracket assembly is representative of the output torque about at least one axis of the support bracket assembly.

According to another embodiment, a method for assessing the performance of an actuator (e.g., a CMG) of an attitude control system is provided. The method includes coupling an actuator to a support bracket assembly and generating an output torque with the actuator. The method further includes measuring the output torque of the actuator about at least one axis of the support bracket assembly with the at least one sensor while the support bracket assembly remains substantially motionless. Additional aspects of the method include measuring the output torque of the actuator about each of a plurality of axes of the support bracket assembly (e.g., a pitch and a roll axis).

According to one embodiment, the method further comprises coupling at least one sensor to at least a portion of the support bracket assembly. Additionally, the measuring step comprises measuring the output torque with a torque sensor. According to another embodiment, the measuring step comprises measuring the displacement of a portion of the support bracket assembly with a laser sensor. The displacement of the portion of the support bracket assembly is representative of the output torque about at least one axis of the support bracket assembly

BRIEF DESCRIPTION OF THE DRAWINGS

Reference will now be made to the accompanying drawings, which are not necessarily drawn to scale, and wherein:

FIGS. 4(a)-4(c) illustrate CMGs according to various embodiments of the present invention;

FIG. 5 shows an exploded view of a CMG according to one embodiment of the present invention;

DETAILED DESCRIPTION OF VARIOUS EMBODIMENTS OF THE INVENTION

Various embodiments of the present invention will now be described more fully hereinafter with reference to the accompanying figures, in which some, but not all embodiments of the inventions are shown. Indeed, these inventions may be embodied in many different forms and should not be construed as limited to the embodiments set forth herein. Rather, these embodiments are provided so that this disclosure will satisfy applicable legal requirements. Like numbers refer to like elements throughout.

Figure 1A:
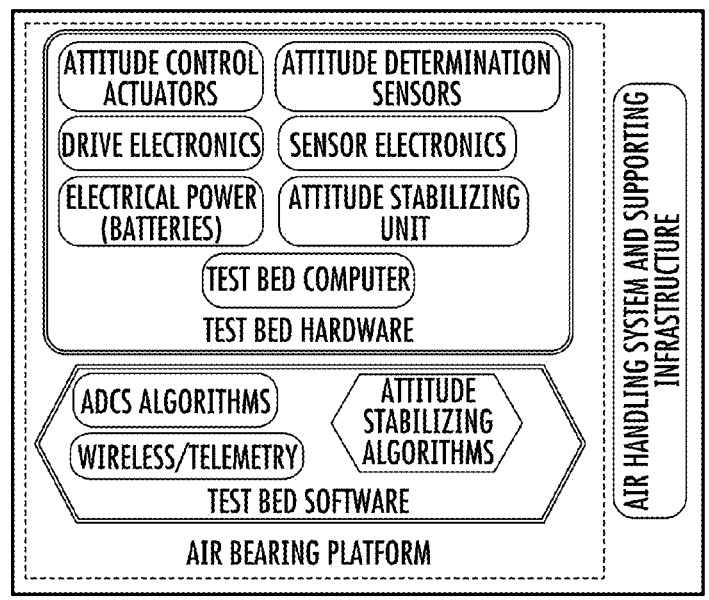
FIG. 1(a) illustrates a schematic of a conventional test bed.
Figure 1B:
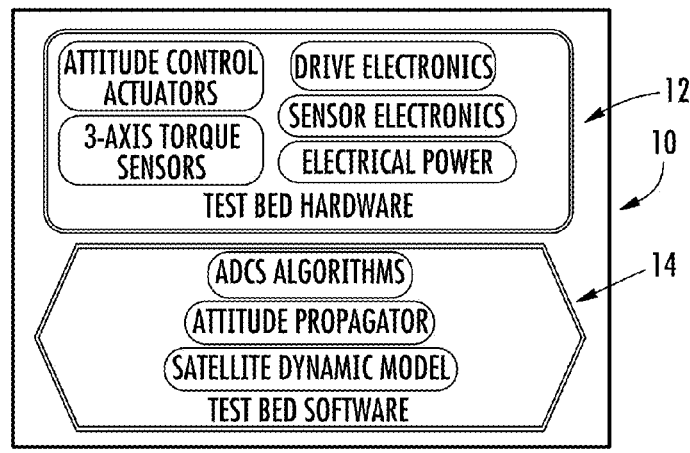
FIG. 1(b) illustrates a schematic of a system for assessing performance of an actuator according to one embodiment of the present invention.

Embodiments of the present invention are directed to a system and method for assessing the performance of an ACS actuator such as a CMG for small satellites (e.g., pico and nano-satellites). In one embodiment, the present invention facilitates 3-axis testing of ACSs in any desired environment, although testing of one or more axes is also contemplated. FIG. 1(b) illustrates a schematic of one embodiment of a system 10 for performing such testing, wherein the system 10 includes test bed hardware 12 (e.g., attitude control actuators, torque sensors, drive electronics, sensor electronics, electrical power) and software 14 (e.g., ADCS algorithms, attitude propagator, and satellite dynamic model). The output torque is sensed using a testing system and then used in simulation of the spacecraft dynamic motion.

Most of the shortcomings of conventional air bearing based test beds arise from the fact that motion is required for the functioning of these platforms. One advantage of embodiments of the present invention is to use a motionless torque sensing platform to characterize the output torque of the attitude control actuators. In particular, the embodiments of the present invention do not require simulating motion of a satellite or spacecraft. Thus, the system is configured to be "motionless" or "substantially motionless" while measuring the output torque of the actuator. For example, substantially motionless can be defined by deflection of less than about 30 arc minutes. Although the following discussion relates to assessing the performance of a CMG, it is understood that the system may be configured to assess the performance of other actuators for ACSs. In addition, although embodiments of the present invention facilitate testing of a system about at least one axis, the system may be configured to measure output torque about at least one axis or a plurality of axes of the system. Moreover, embodiments of the present invention are adaptable for use with small satellites as discussed above, but may also be adaptable for larger satellites taking into consideration the necessary scaling considerations.

Generally, the CMG 30 includes a flywheel assembly 32, a gimbal assembly 34, and a slip ring assembly 36, as shown in FIGS. 4(b) and 5. One function of the flywheel assembly 32 is to accommodate one or more spinning flywheels 38 and its motor 40 that provide the required angular momentum to the CMG. The flywheel assembly 32 also provides an interface to the gimbal assembly 34. The gimbal assembly 34 is configured to facilitate the rotation of the entire flywheel assembly 32 about the gimbal axis. The gimbal assembly 34 includes a bracket 44 and a gimbal motor plate or housing 46. The bracket 44 and the gimbal motor housing 46 support the pivoting of the flywheel assembly 32. A plurality of CMGs may be coupled together in various configurations (e.g. pyramidal as shown in FIG. 4(c)) for use with satellites. For more details regarding exemplary CMGs and associated satellites, please see International Application No. PCT/US2010/035397, entitled Attitude Control System for Small Satellites, filed on May 19, 2010, which is incorporated by reference in its entirety herein.

Exemplary parameters of interest to characterize and verify performance of an attitude control system are the pointing accuracy, jitter, slew rates, and torque output. All of these parameters are a function of the torque produced by the attitude actuator. In traditional air bearing test beds, the actuator would enable the movement of some of the components of the spacecraft along with the test bed itself on an air bearing. The pointing accuracy, jitter, and slew rate of the spacecraft are directly measured using onboard sensors. Spacecraft dynamic models are usually available accurately when the control system is being designed. If the output torque of the attitude actuator can be measured in real time, then this torque can be used as an input to the spacecraft dynamic model for simulating the same behavior as that of a test bed on an air bearing. This would eliminate the need for physical motion of the spacecraft (or components) and onboard sensors.

Figure 2:
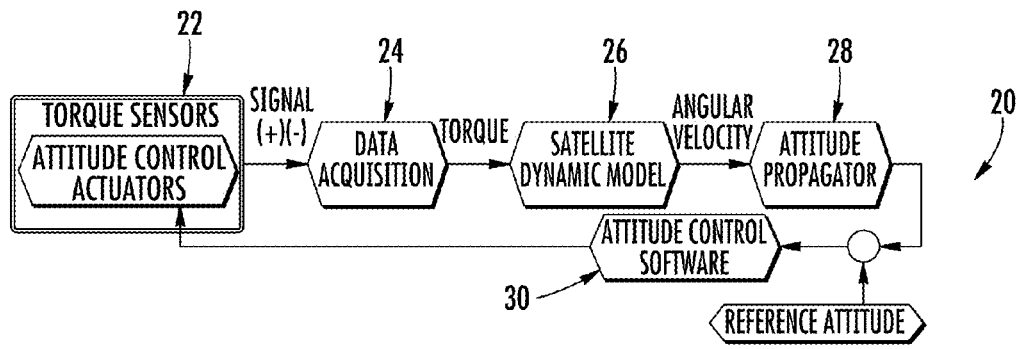
FIG. 2 illustrates a flowchart of a method for assessing performance of a CMG according to one embodiment of the present invention.

FIG. 2 shows a schematic implementation strategy of a system 20 according to one embodiment of the present invention. This method can be implemented for testing a pyramidal cluster of CMGs. The CMG cluster is mounted onto an interface of the system 20 which measures the three dimensional torque output of the CMGs 22. The measured torque along with actuator feedback signals are passed through a signal conditioner and converted into discrete data by a high frequency data acquisition unit 24. The measured torque is input to a spacecraft dynamic model 26 on a computer. The response of the spacecraft is captured by simulation of the dynamic model and the attitude is propagated using another piece of software 28 that uses the output of the simulation. The attitude propagation can also include ADS hardware in the loop if desired, to perform integrated attitude determination and control (ADCS) testing. The computed attitude error is used by the ACS algorithms 30 to command input to the actuators.

Equations of Motion

The CMG produces torque by redistribution of angular momentum; it is a device that stores angular momentum in its flywheels and produces a torque by changing the direction of the flywheel axis or the angular momentum vector. The equation of motion that governs this characteristic is developed below.

Nomenclature $\underline{H}_G$ Total angular momentum of the CMG about the gimbal center of mass $\underline{H}_G^f$ Angular momentum of the flywheel about the gimbal center of mass $\underline{H}_G^g$ Angular momentum of the gimbal about the gimbal center of mass $\underline{I}^f$ Inertia of the flywheel $\underline{I}^g$ Inertia of the gimbal $\underline{\omega}^f$ Angular velocity of the flywheel $\underline{\dot{\omega}}^f$ Angular acceleration of the flywheel $\underline{\omega}^s$ Angular velocity of the spacecraft $\underline{\dot{\delta}}$ Angular velocity of the gimbal $\underline{\ddot{\delta}}$ Angular acceleration of the gimbal $\underline{\tau}^d$ Total dynamic torque produced by the CMG $\underline{\tau}^{gy}$ Total gyroscopic torque produced by the CMG $\underline{\tau}^{fa}$ Torque due to flywheel acceleration $\underline{\tau}^{ga}$ Torque due to gimbal acceleration The total angular momentum of the CMG, $$\underline{H}_G = \underline{H}_G^f + \underline{H}_G^g$$

$$\underline{H}_G = \underline{I}^f \underline{\omega}^f + \underline{I}^g \underline{\dot{\delta}} \qquad (1)$$

Where $\underline{H}_G^f$ and $\underline{H}_G^g$ the angular momenta of the flywheel and the gimbal respectively about the gimbal center of mass, $\underline{I}^f$ and $\underline{I}^g$ are the inertias of the flywheel and gimbal respectively, $\underline{\omega}^f$ and $\underline{\dot{\delta}}$ are the angular velocities of the flywheel and the gimbal respectively. From Euler's law, the rate of change of angular momentum is equal to the torque acting on the system.

$$\frac{d}{dt}(H_G) = \frac{d}{dt}(\underline{I}^f \underline{\omega}^f) + \frac{d}{dt}(\underline{I}^g \underline{\dot{\delta}}) + (\underline{\dot{\delta}} + \underline{\omega}^s) \times (\underline{I}^f \underline{\omega}^f + \underline{I}^g \underline{\dot{\delta}}) \qquad (2)$$

$$\frac{d}{dt}(H_G) = \frac{d}{dt}(\underline{I}^f \underline{\omega}^f) + \frac{d}{dt}(\underline{I}^g \underline{\dot{\delta}}) + \underline{\dot{\delta}} \times (\underline{I}^f \underline{\omega}^f) + \underline{\omega}^s \times (\underline{I}^f \underline{\omega}^f + \underline{I}^g \underline{\dot{\delta}})$$

$$\frac{d}{dt}(H_G) = \underbrace{\underline{I}^f \underline{\dot{\omega}}^f}_{Flywheel\ Acceleration} + \underbrace{\underline{I}^g \underline{\ddot{\delta}}}_{Gimbal\ Acceleration} + \underbrace{\underline{\dot{\delta}} \times (\underline{I}^f \underline{\omega}^f) + \underline{\omega}^s \times H_G}_{Gyroscopic\ (control)} = \underline{\tau}^d \qquad (3)$$

$\underline{\ddot{\delta}}$ is the angular acceleration of the gimbal, $\underline{\omega}^s$ is the angular velocity of the spacecraft and $\underline{\tau}^d$ is the total dynamic torque output of the CMG. Equation (3) is the governing equation for the dynamic torque produced by the CMG. Torque due to flywheel and gimbal accelerations are not used for control and are unwanted consequences which occur during start and stop of flywheel and gimbal motion; it is ideal to have the torques due to flywheel and gimbal accelerations to be zero.

The total dynamic torque produced by all four CMGs is given by $$\underline{\tau}^d = \sum_{i=1}^{4} \underline{\tau}^{di} \qquad (4)$$

Attitude Control Testing Architecture

Figure 3:
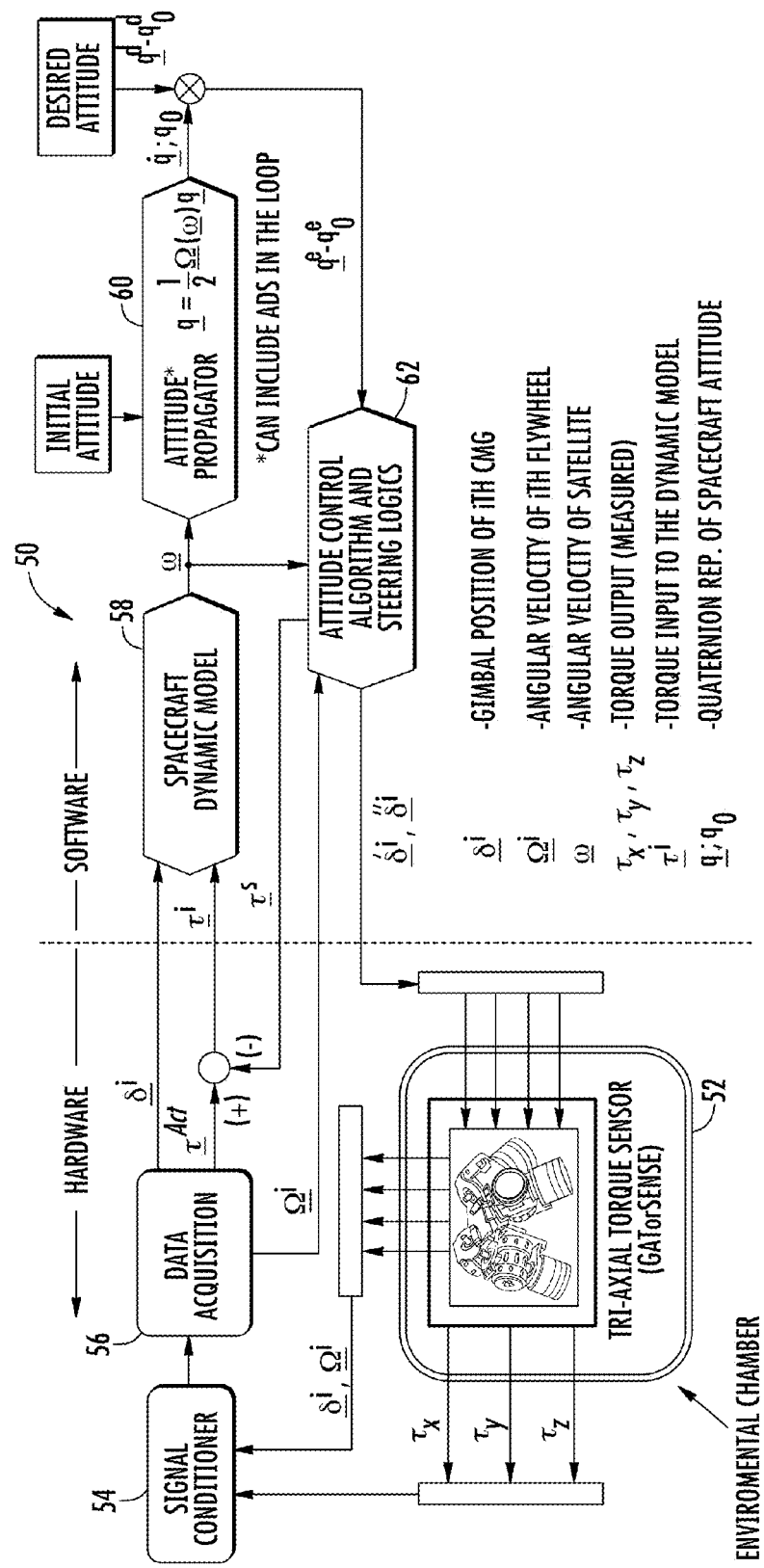
FIG. 3 illustrates a flowchart of a method for assessing performance of a CMG according to one embodiment of the present invention.

A single unit of CMG produces torque proportional to the gimbal speed and lies on plane as was shown in the previous section. The torque span of a pyramidal CMG arrangement belongs to $\Re^3$. In one embodiment, a three axis torque sensor is required to determine the output of the pyramidal cluster. The hardware and software architecture of a system 50 according to one embodiment is shown in FIG. 3. The torque output of the CMGs may be measured using a tri-axial torque sensor 52. The output of the torque sensor 52 is passed through a signal conditioner 54 with a built in filter and acquired using a data acquisition unit 56. The sampled data is further filtered and scaled based on the sensitivity of the transducer. The output torque is now fed into the spacecraft dynamic model 58 (e.g., via Simulink on a computer). The response of the spacecraft (angular velocity of the spacecraft) is used in an attitude propagation algorithm 60 to determine the attitude of the spacecraft. The misalignment between the desired attitude and measured attitude of the spacecraft is the attitude error and is fed into the attitude control algorithm 62. The attitude control algorithm 62 determines the required torque, and the CMG steering logics 62 determine the appropriate gimbal rates and accelerations to be commanded to achieve this torque. The gimbal rates and accelerations are commanded to the CMG gimbal motors. In the case of CMG testing, it is noted that the spacecraft angular velocity affects the performance of the CMG as it produces a gyroscopic torque on the gimbals (the $\underline{\omega}^s \times \underline{H}_G$ term in Eq. (3), represented by $\underline{\tau}^s$ in FIG. 3). This torque is not naturally captured in the aforementioned technique as it would have been in air bearing test beds as the CMGs are not on a moving platform that emulates spacecraft motion. This issue may be addressed using the torque compensation technique—the torque on the gimbals can be computed using the CMG flywheel angular velocity (feedback from CMG) and spacecraft angular velocity (output of spacecraft dynamic model); this torque is subtracted from the output torque of the CMGs before it is sent as an input to the spacecraft dynamic model.

System Design

The system design discussed below is for a single axis version with a built in capacity to be extended to a two axis version. The same concept can be extended to design two or more axis versions. Thus, although the discussion below relates to a single axis system, the system may be modified for use with a plurality of axes in alternative embodiments.

Figure 6:
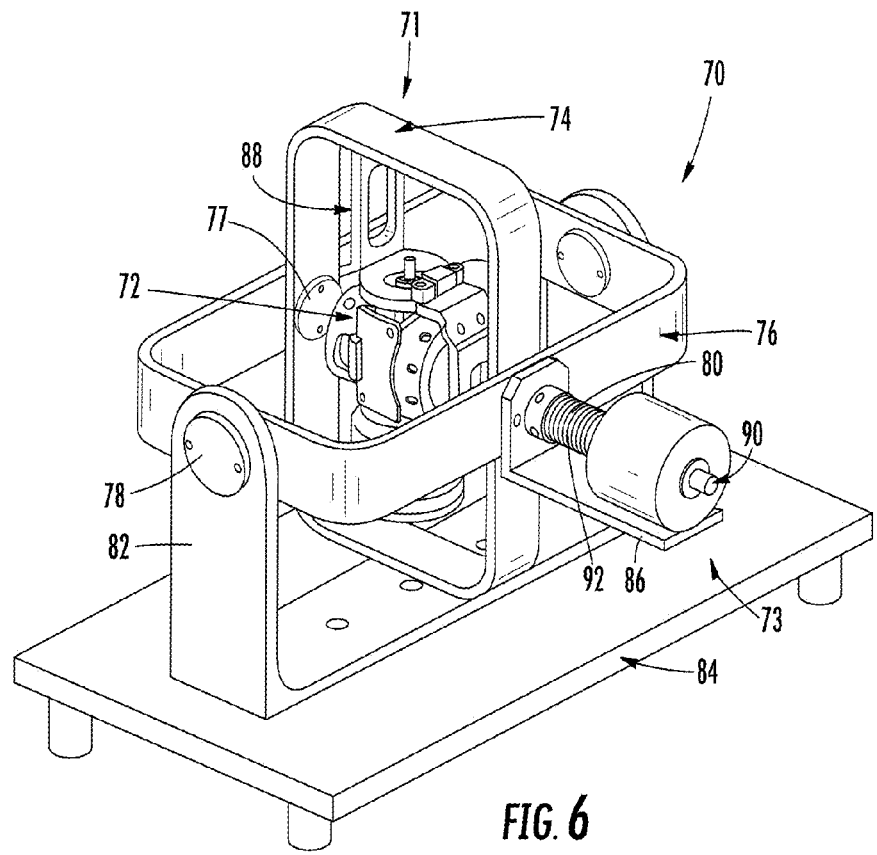
FIG. 6 depicts a system for assessing performance of a CMG according to one embodiment of the present invention.

FIG. 6 shows a system 70 with a CMG 72 mounted thereon according to one embodiment of the present invention. The system 70 generally includes a support bracket assembly 71 and at least one sensor assembly 73. The support bracket assembly 71 includes a pitch axis gimbal 74 pivotally coupled to a roll axis gimbal 76. The pitch axis gimbal 74 is configured to pivot with respect to the roll axis gimbal 76. The pitch axis gimbal 74 is aligned in a generally vertical plane, while the roll axis gimbal 76 is aligned in a generally horizontal plane. The gimbals 74, 76 may be made of various materials, such as aluminum, and are designed to have very low inertia. The pitch axis gimbal 74 is mounted inside the roll axis gimbal 76, wherein the gimbals may be rectangular or other shapes with respective openings for accommodating and supporting the CMG 72 therein. The pitch axis gimbal 74 comprises an actuator mount bracket 88 to which the CMG can be attached, thereby facilitating transfer of the output torque of the CMG to the support bracket assembly 71. It is of note that the CMG is capable of its full range of motion due to its positioning within the support bracket assembly. Thus, the system is configured for testing the CMG over its entire range of motion.

The pitch axis gimbal 74 and roll axis gimbal 76 may be coupled via a pair of inner gimbal pivots 77 extending along a pitch axis of the support bracket assembly 71. In the illustrated embodiment, the inner gimbal pivots 77 may be small stainless steel shafts coupled to the pitch axis gimbal 74. The shafts may be located on small low friction bearings (friction coefficient<0.01) mounted on the roll axis gimbal 76. One of the shafts, or transducer coupler shaft 80, is longer than the other and projects through the roll axis gimbal 76.

The roll axis gimbal 76 is mounted on a pair of outer gimbal pivots 78 along a roll axis of the support bracket assembly 71 in a similar manner as the inner gimbal pivots 77. In this regard, the roll axis gimbal 76 is coupled to a support or U-shaped bracket 82 via the inner gimbal pivots 78. However, the support bracket 82 is stationary and is fixed to a rigid isolated platform 84. The rotation of the roll axis gimbal 76 about these pivots 78 is locked using fasteners for a single axis measurement. This locking can be removed to extend the testing to two-axis as explained in further detail below.

The sensor assembly 73 includes a pitch axis sensor bracket 86 or transducer bracket, which may be L-shaped. The transducer bracket 86 may be attached to the roll axis gimbal 76 on the side through which the transducer coupler shaft 80 extends. A highly sensitive transducer sensor 90 capable of measuring small torques is mounted on the transducer bracket 86 with the measuring shaft pointing towards the gimbals 74, 76. The arrangement is such that the transducer shaft is collinear with the transducer coupler shaft 80 with some axial spacing sufficient to accommodate a flexible coupling 92. A suitable coupling 92 with high torsional stiffness but low bending stiffness is chosen to couple the transducer shaft and the transducer coupler shaft 80. The bending flexibility accommodates any misalignments between the two shafts without damaging the sensitive transducer shaft. Once this coupling is fixed, the pitch axis gimbal 74 cannot rotate freely and is constrained by the transducer shaft. Any torque applied on the pitch axis gimbal 74 about the pitch axis is now measured by the transducer 90 while the support bracket assembly 71 remains substantially motionless. A similar transducer can be used on the roll axis gimbal to obtain two axis torque measurements as explained below.

Figure 7:
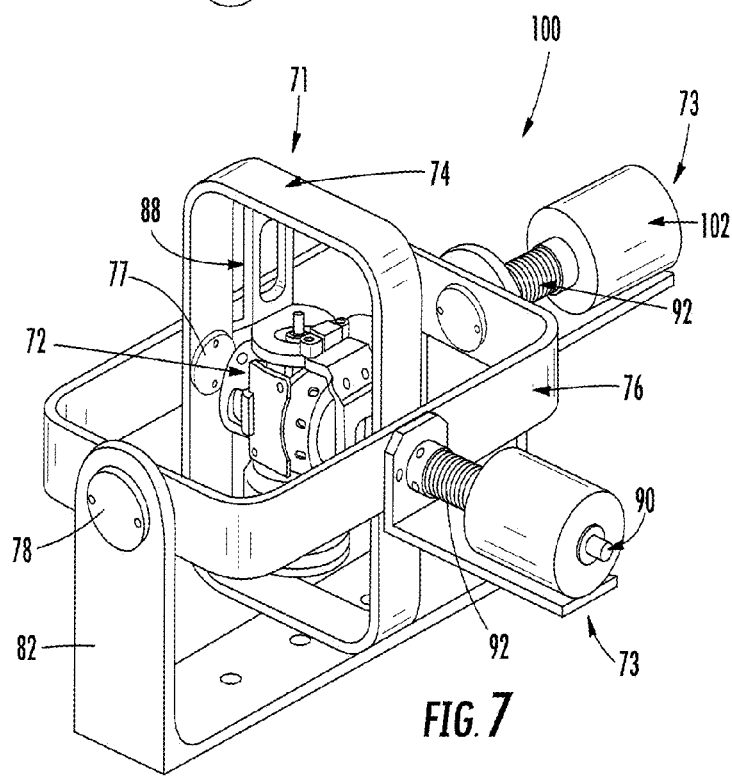
FIG. 7 depicts a system for assessing performance of a CMG according to another embodiment of the present invention.

According to another embodiment, a system 100 for measuring output torque about two axes is illustrated in FIG. 7 and may be used to characterize the performance of a CMG 72. As before, the system 100 also includes a pitch axis gimbal 74 and a roll axis gimbal 76. The pitch axis gimbal 74 may be pivotally mounted on the inside of the roll axis gimbal using low friction bearings. The roll axis gimbal 76 is also pivotally coupled to the support bracket 82, such as via low friction bearings. In this embodiment, a plurality of sensor assemblies 73 are provided. The second sensor assembly 73 includes a roll axis sensor or transducer 102 mounted on the support bracket 82. This transducer 102 measures any torque about the roll axis. The CMG 72 is mounted such that its torque output lies in the plane formed by the pitch and the roll axes of the support bracket assembly 71. The sensor assemblies 73 are capable of measuring the torque output of the CMG about the pitch and the roll axes while the support bracket assembly 71 remains substantially motionless. The system 100 is scalable or otherwise adaptable for different actuators through the exchange of the torque transducers for measuring the appropriate torque. The bias torque due to the overhanging transducer 90, 102 is constant as the setup is motionless and can be either removed by static balancing or by negating the bias from the measurement. The torque due to the change in center of mass location of CMG 72 can be calculated from the position of the gimbals 74, 76 and can be taken into account in the scaling before input to the spacecraft dynamic model.

System Design with Three Axes

Figure 21:
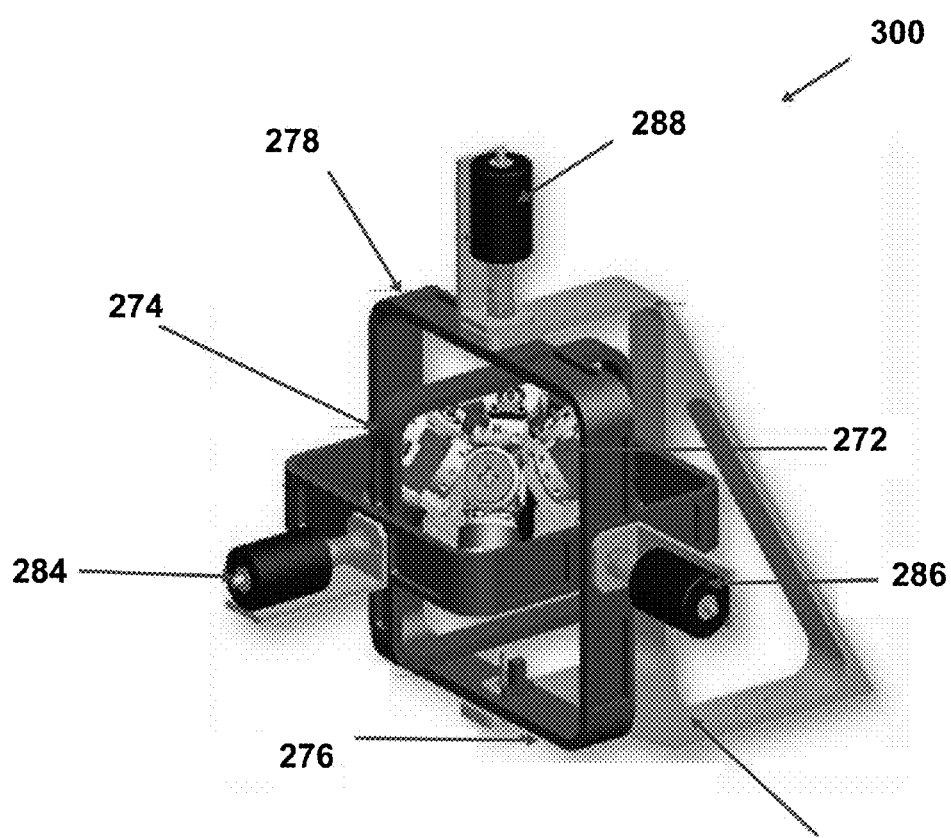
FIG. 21 depicts a system for assessing performance of a CMG according to another embodiment of the present invention.

As noted above, the system design described herein may extend to any number of axes. For example, in some embodiments, a system 200 for measuring output torque about three axes is illustrated in FIG. 21 and may be used to characterize the performance of a CMG 272. As before, the system 200 also includes a pitch axis gimbal 274 and a roll axis gimbal 276. In addition, however, the system 200 further includes a yaw axis gimbal 278. The pitch axis gimbal 274 may be pivotally mounted on the inside of the roll axis gimbal 276 using low friction bearings. The roll axis gimbal 276 is also pivotally coupled on the inside of the yaw axis gimbal 278 using low friction bearings. Further, the yaw axis gimbal 278 is pivotally coupled to a support bracket 282, such as via low friction bearings.

In this embodiment, a plurality of sensor assemblies 284, 286, 288 are provided. The first sensor assembly 284 includes a pitch axis sensor or transducer coupled to the roll axis gimbal and configured to measure torque about the pitch axis. The second sensor assembly 276 includes a roll axis sensor or transducer coupled to the yaw axis gimbal 278 and configured to measure torque about the roll axis. The third sensor assembly 288 includes a yaw axis sensor or transducer coupled to the support bracket assembly 282 and configured to measure torque about the yaw axis. The CMG 272 is mounted such that its torque output lies in the plane formed by the pitch, roll, and yaw axes of the support bracket assembly 282. The sensor assemblies 284, 286, 288 are capable of measuring the torque output of the CMG about the pitch, roll, and yaw axes while the support bracket assembly 282 remains substantially motionless. The system 200 is scalable or otherwise adaptable for different actuators through the exchange of the torque transducers for measuring the appropriate torque. The bias torque due to offsets of center of mass (e.g., from the overhanging transducers) are constant as the setup is motionless and can be either removed by static balancing or by negating the bias from the measurement. The torque due to the change in center of mass location of CMG 272 can be calculated and can be taken into account in the scaling before input to a spacecraft dynamic model.

Measurement Technique

Figure 8:
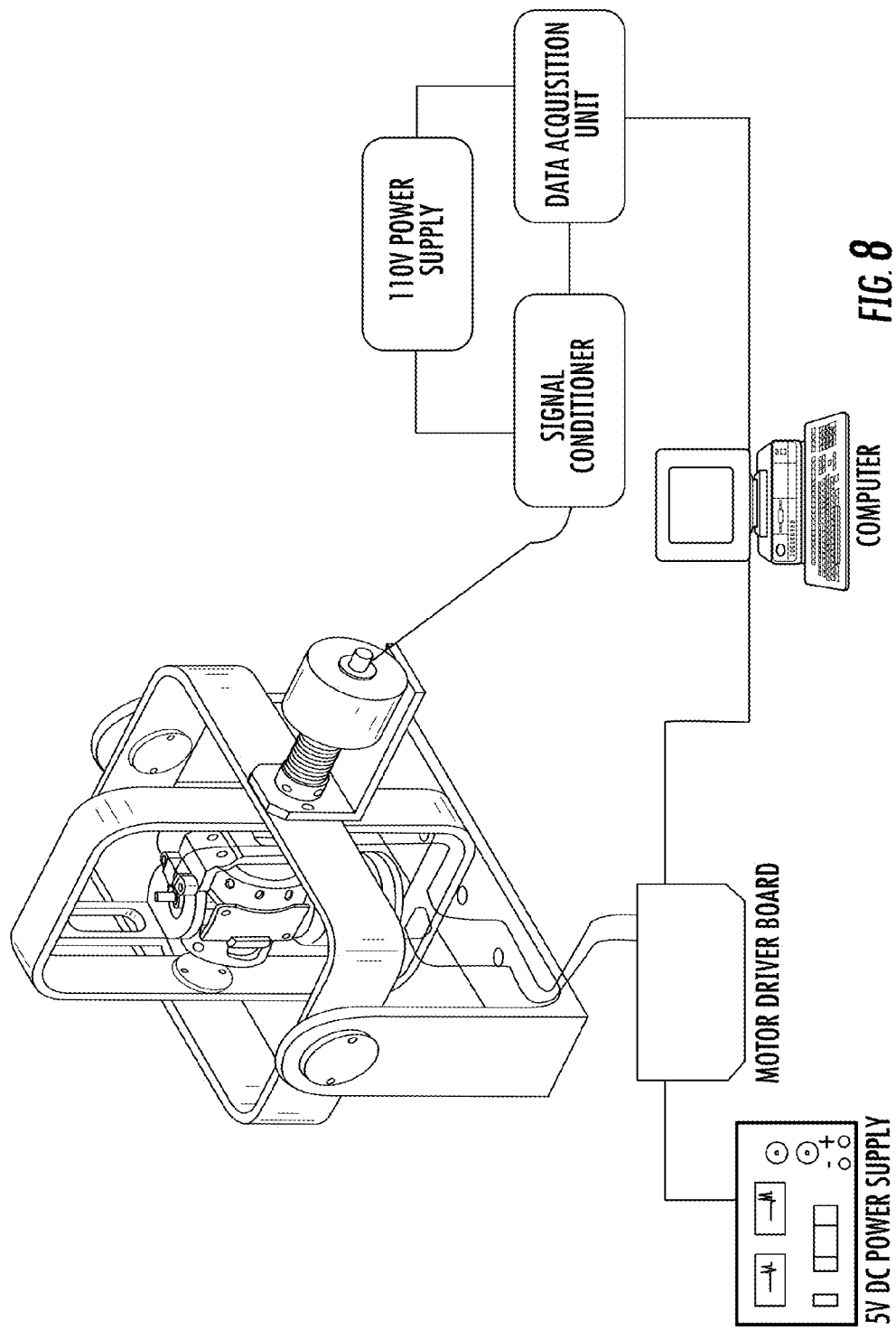
FIG. 8 illustrates a system for assessing performance of a CMG according to one embodiment of the present invention.
Figure 9:
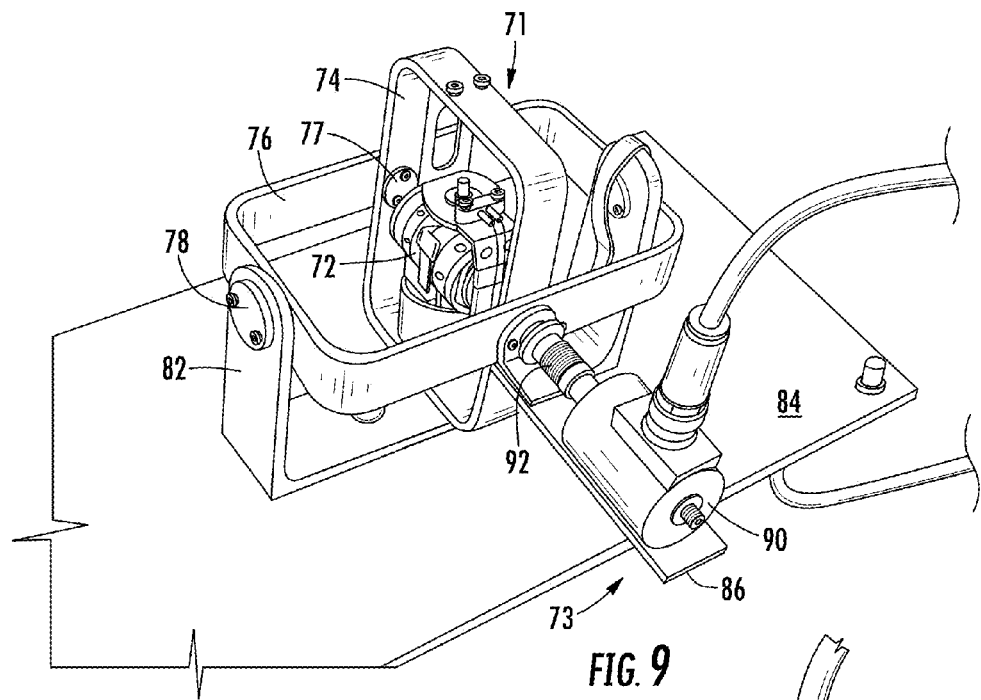
FIGS. 9-14 illustrate various views of a prototype system for assessing performance of a CMG according to one embodiment of the present invention.
Figure 10:
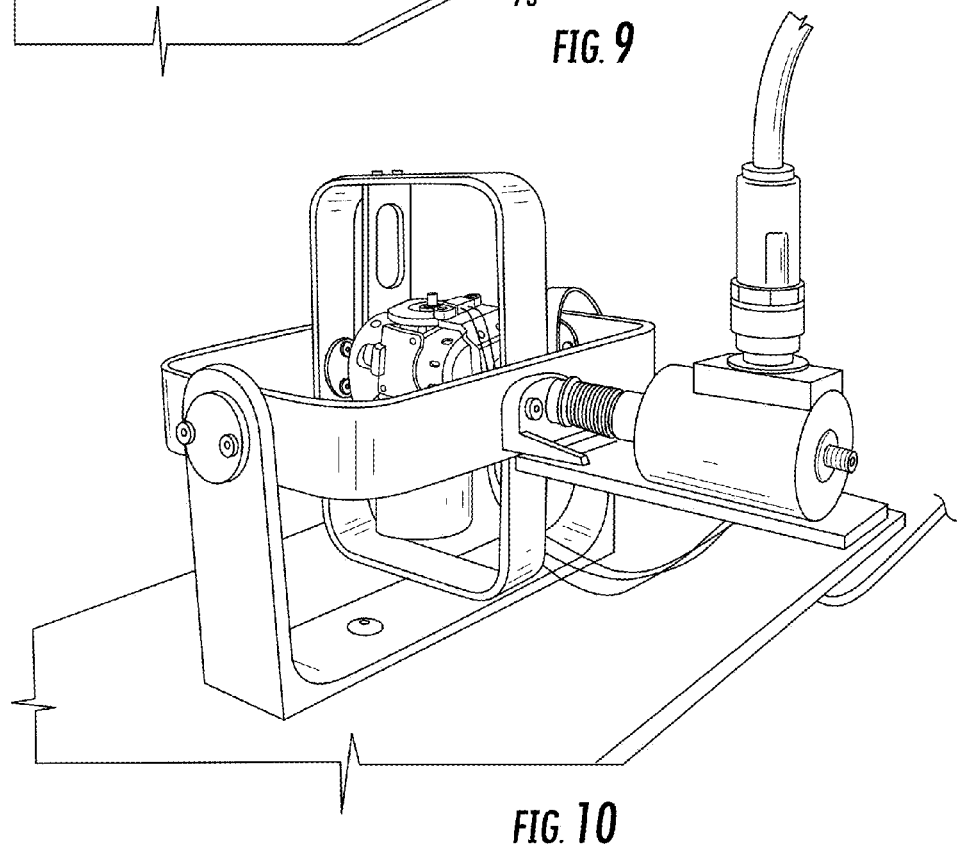
Figure 11:
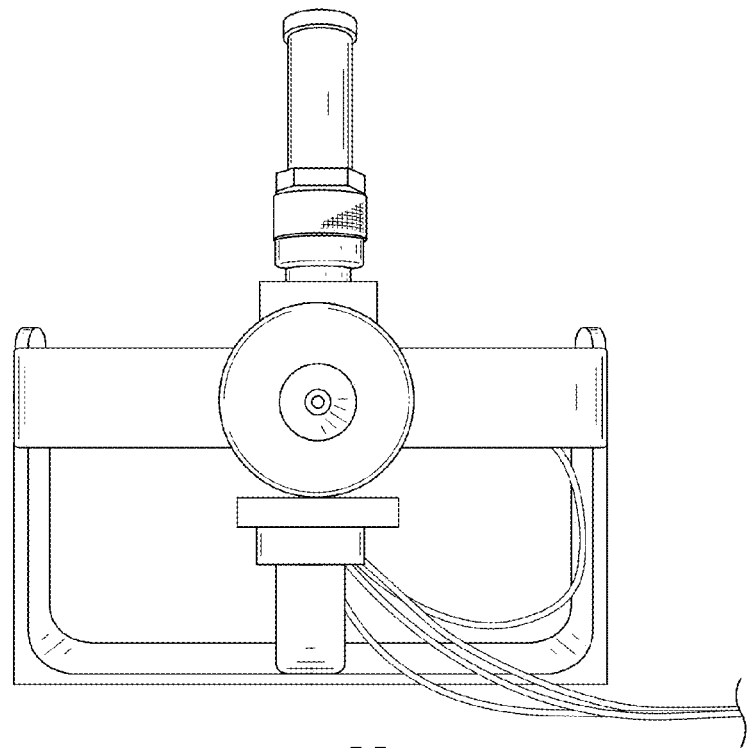
Figure 12:
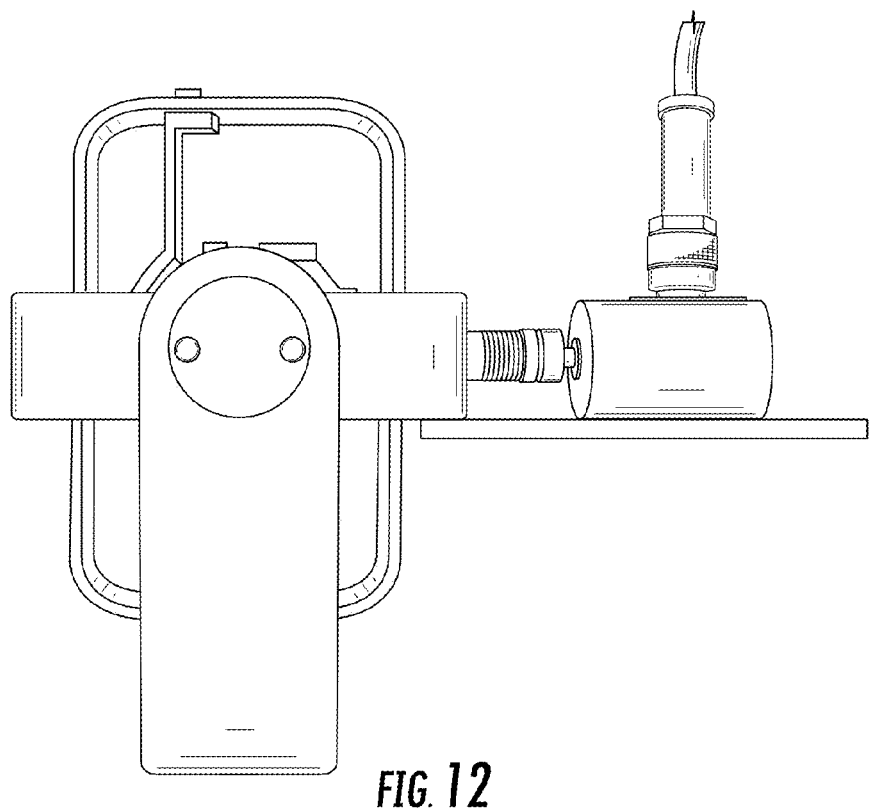
Figure 13:
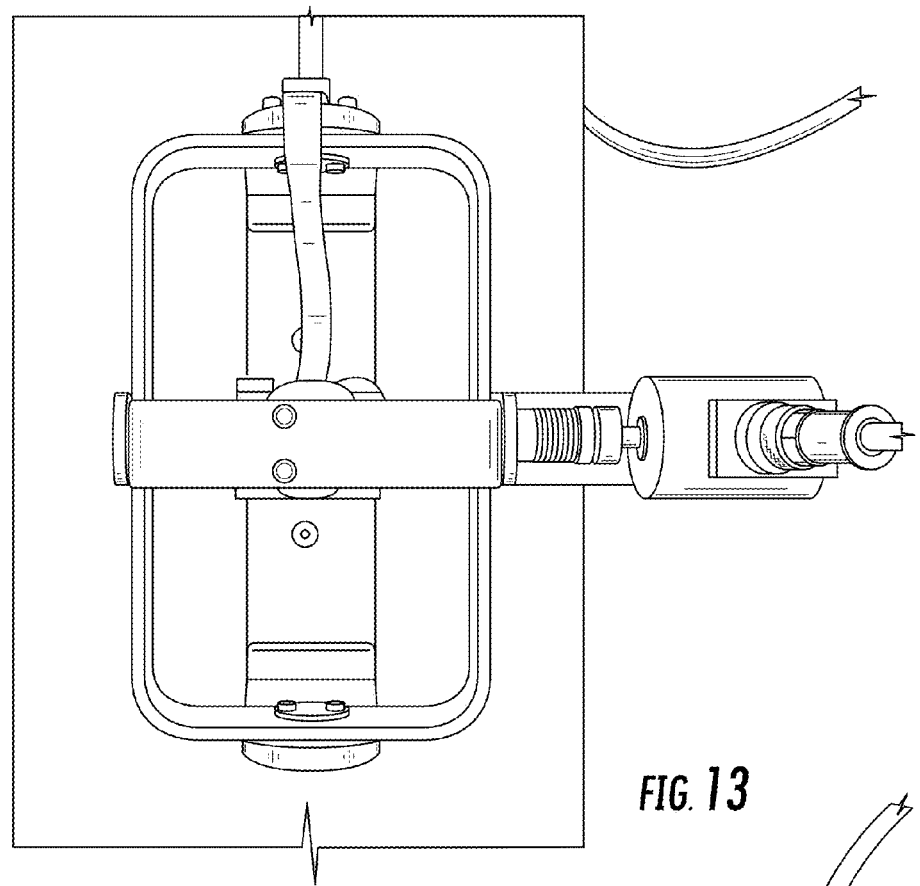
Figure 14:
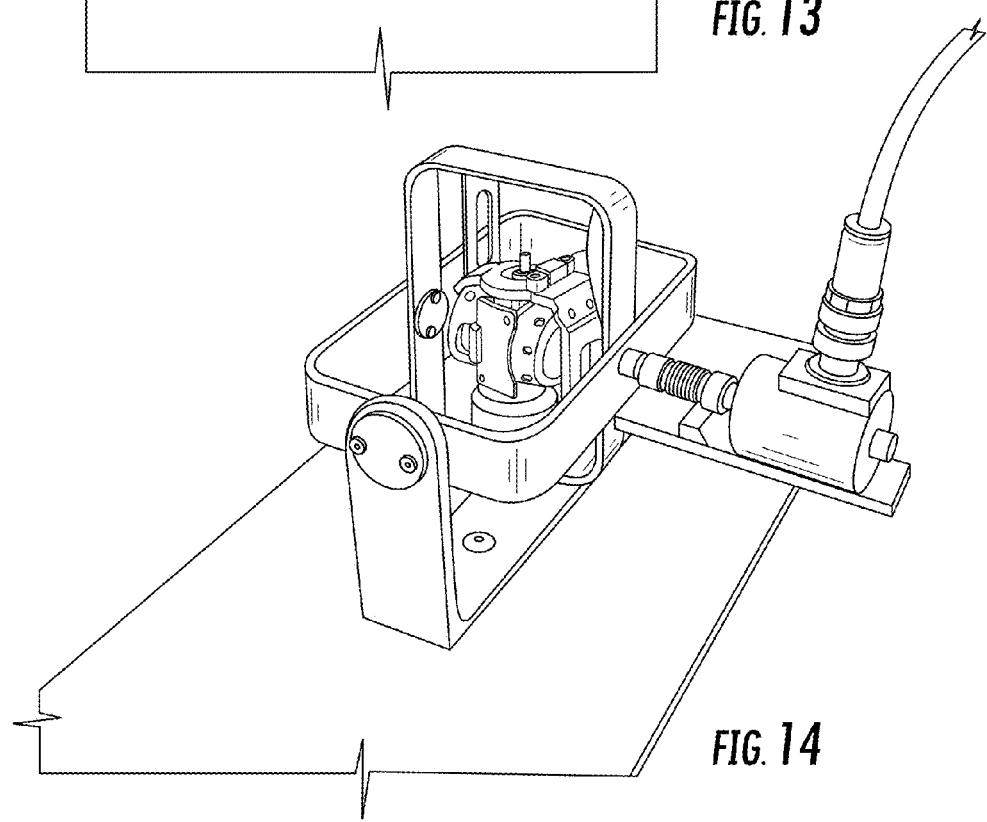

FIG. 8 shows a test setup for measuring the output torque of a CMG according to one embodiment of the present invention. A CMG is mounted on the pitch axis gimbal via an actuator mounting bracket. Any torque produced by the CMG about the pitch axis is measured by the transducer. The torque transducer is connected to a data acquisition system via a signal conditioner. The output voltage of the signal conditioner, which is a measure of the torque being measured by the transducer is sampled by the data acquisition system and may be stored on a computer for analysis. The CMG may be controlled via a motor controller. The wires connecting the CMG to the motor controller are preferably a very thin gauge as it can cause additional torque on the transducer. The design can include a slip ring that will mitigate this issue.

Prototype and Test Results

A prototype system of a single axis version is shown in FIGS. 9-14. Several tests were conducted before and during the testing to understand the system. Various exemplary steps may be performed prior to beginning testing. For example, the CMG is typically mounted on the support bracket assembly before mounting the sensor, and the data acquisition system may be connected to the sensor during assembly so that the torque of the sensor can be monitored. The roll axis gimbal is fixed with fasteners, and the gimbal motor and flywheel motor control board (via slip rings) are connected to the motor driver board. The motor driver board is powered with an adequate power supply (e.g., 5V DC motor), while the signal conditioner and data acquisition system also include a power source (e.g., 110 V). The sensor is then connected to the signal conditioner and the data acquisition unit, and the computer is configured to record the sensor output in real time. The power to the motor driver board and flywheels are rotated at a constant speed, such as 4500 rpm. The gimbals may also be rotated at a constant speed, such as 0 to 2 rad/s. The torque output and gimbal speed is recorded. The test may be repeated for different gimbal and/or flywheel speeds. The recorded values may then be compared to theoretical values for further analysis.

Noise Analysis

Figure 15:
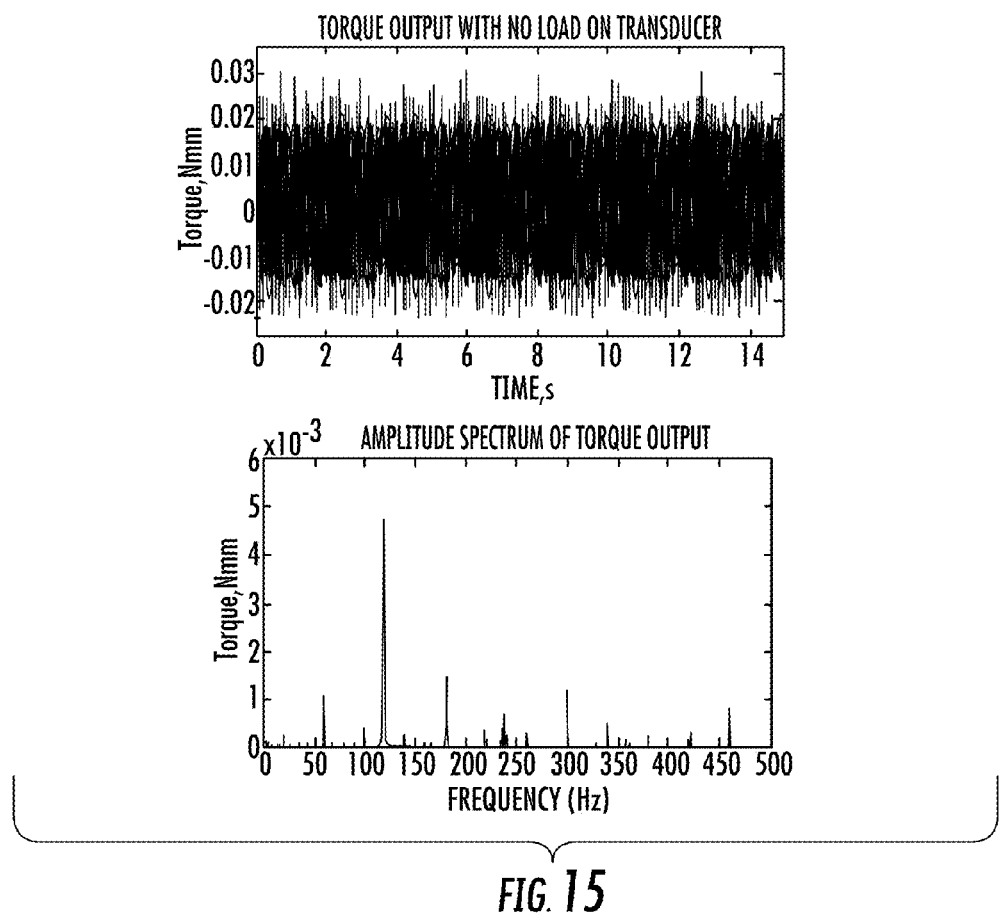
FIGS. 15-20 show various test results of the system shown in FIGS. 9-14.

The torque transducer was connected to a data acquisition system sampling at 1000 Hz. Data was taken without loading the transducer to analyze the transducer and the environmental noise characteristics. This test would also identify any bias in the transducer output. A Fast Fourier Transform (FFT) was performed on the data acquired to identify if the noise was random. FIG. 15 shows the data recorded and its FFT. It is shown that the mean of the recorded data is zero. The FFT shows that the amplitude of the spectrum is almost evenly spread over all frequencies except for some peaks. One evident peak is from the 60 Hz electrical noise. Another peak at about 230 Hz is due to a fan on the computer of the data acquisition system.

Mean Value/Bias Analysis

Figure 16:
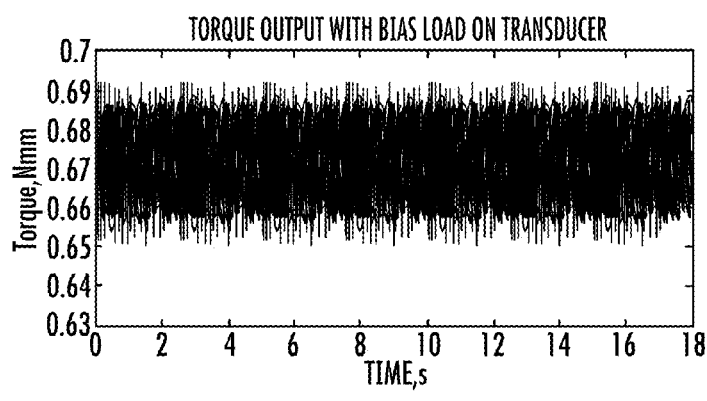

The torque transducer was mounted on the system with the CMG turned off. The data was recorded to determine any bias torque (static torque) acting on the transducer due to center of mass offset from the pitch axis of the gimbal. The recorded data is shown in FIG. 16 and the mean of the data is calculated to be about 0.6717 Nmm. This value is subtracted from the measurements during the torque test of the CMGs.

Gimbal Shaft—Coupling—Transducer Shaft Drive System Analysis

Figure 17:
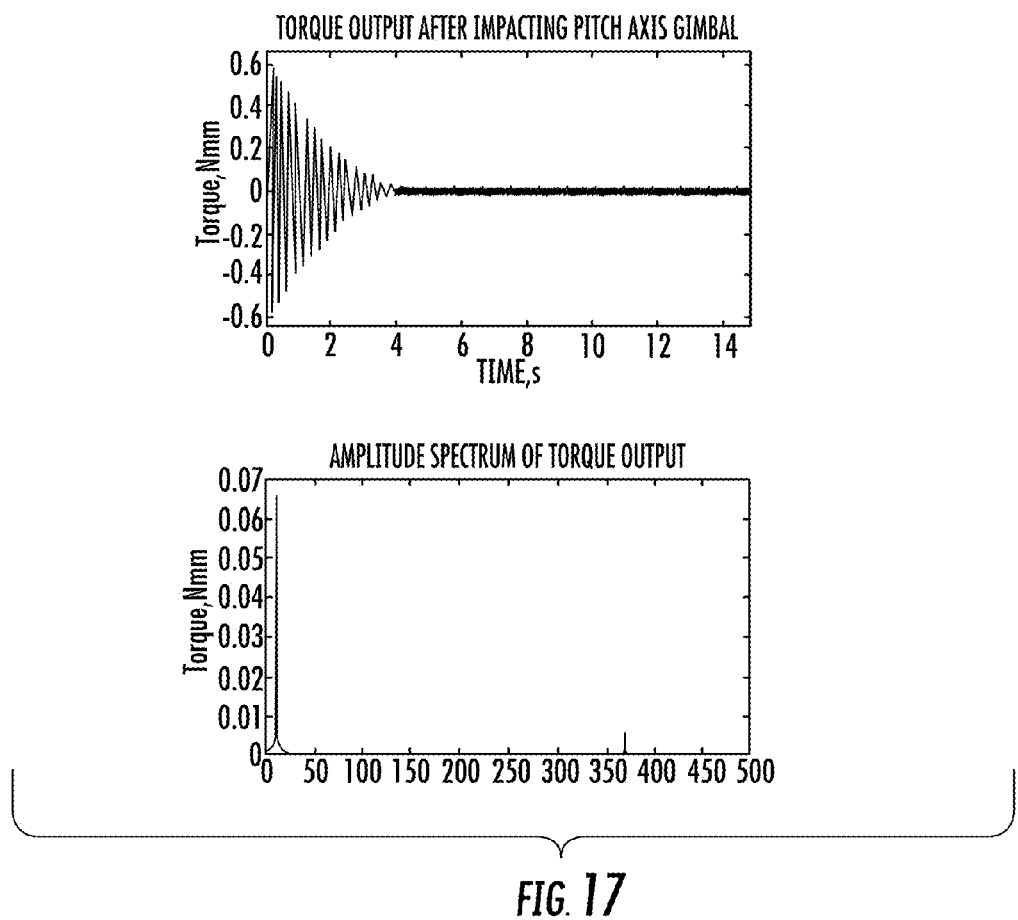

The transmission from the pitch axis gimbal to the transducer strain gauges via the gimbal shaft, flexible coupling, and the transducer shaft has its own dynamics approximated to be of second order. A test was done to identify the natural frequency of this system and be sure that it is not in the range of the operating frequency of the CMG flywheel. To perform this test, the pitch axis gimbal was slightly disturbed by impacting it lightly by hand. Data was taken until the oscillations settled out. An FFT was performed on this data to identify the natural frequency of the system. FIG. 17 shows the recorded data and its FFT. It can be seen that the natural frequency of this system is about 10 Hz which is much less than the normal flywheel speed of 75 Hz.

Torque Output at Flywheel Start

Figure 18:
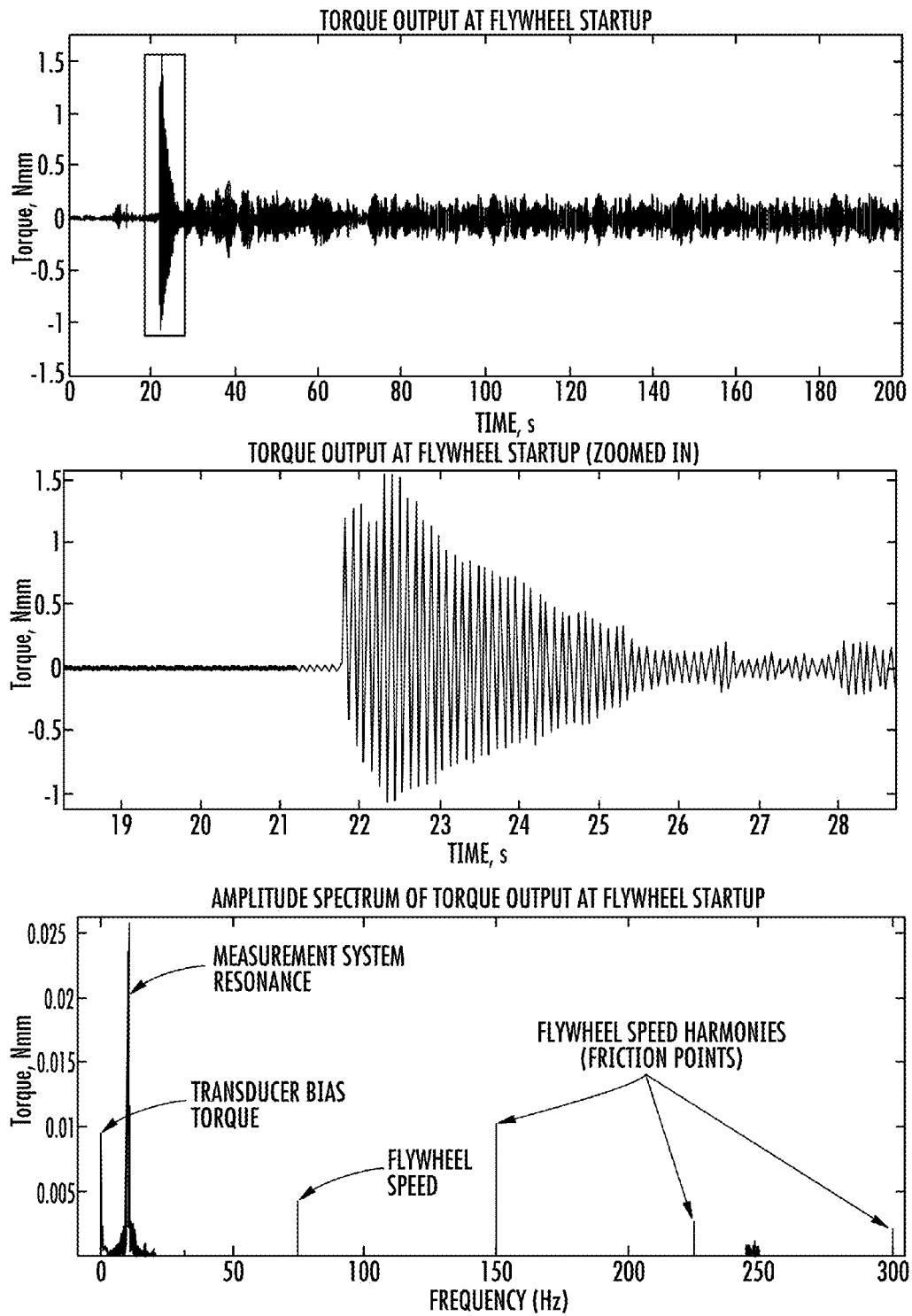

The flywheel axis is aligned with the pitch axis by rotating the gimbal. The flywheel is started while the data from the torque transducer is being recorded. This test will capture the torque output due to the acceleration of the flywheel as shown in Equation (3). This torque measurement is important in the development of the ACS. Data are recorded even after the flywheel reaches its maximum speed and is spinning continuously at this speed. This is done in order to quantify the disturbance created by the flywheel acceleration while trying to maintain constant speed and overcoming friction. The plot of the measured data and its FFT are shown in FIG. 18. The flywheel was switched on at about 22 s. It can be seen that there are peaks at about 10, 75, 150, 225 and 300 Hz. The 10 Hz peak is due to the natural frequency of the system identified above. This occurs when the flywheel accelerates imparting instantaneous torque onto the system and then run at constant speed similar to impacting the pitch axis gimbal. The peak at 75 Hz is due to the control speed of the flywheel at 4500 rpm. The peak at 150, 225 and 300 Hz are due to the friction in the bearing showing up as multiples of the flywheel speed. FIG. 18 shows that the dynamics of the measurement system is coupled with the CMG dynamics. Hence the flywheel startup torque output, even though a step appears as oscillatory torque in the measurements.

Torque Output at Gimbal Speed of 1 Hz

Figure 19:
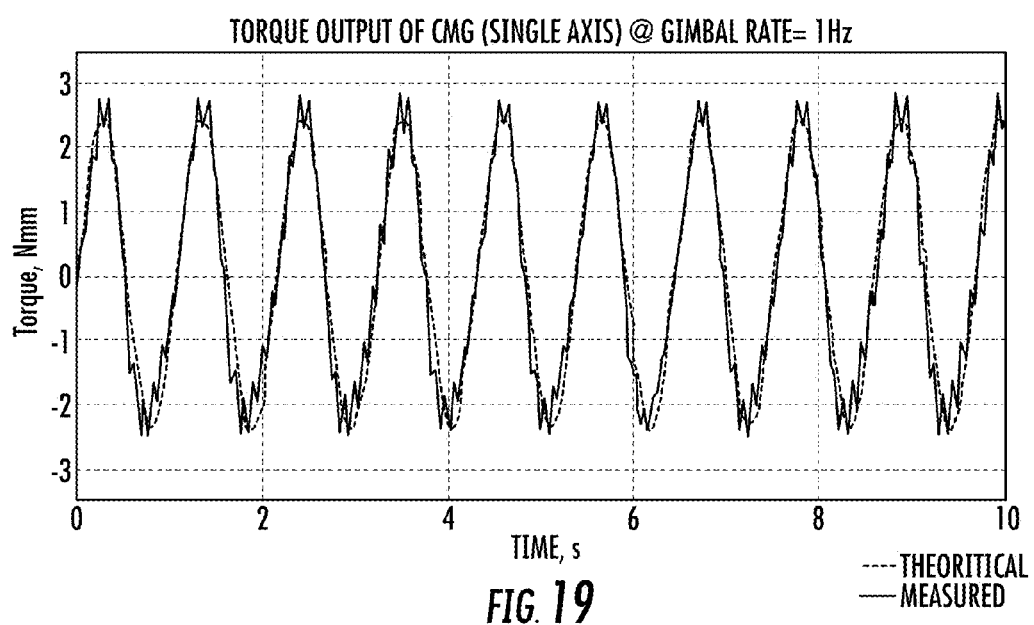

This test measures the gyroscopic torque output of the CMG as set forth in Equation (3). The gyroscopic torque is perpendicular to the flywheel and the gimbal axis. The transducer measures the maximum torque when the flywheel axis is perpendicular to the pitch axis of the system. It measures the pitch axis component of the torque elsewhere. Hence the output torque profile should look like a sinusoid with a frequency equal to the gimbal rotating frequency. The torque output measurement is shown in FIG. 19. It can be seen that the measurement follows the theoretical values closely. The downward slope on the sinusoid is steeper than the positive slope as there may have been a misalignment in the gimbal axis which caused wobble and lower frictional resistance on one half of the cycle.

Figure 20:
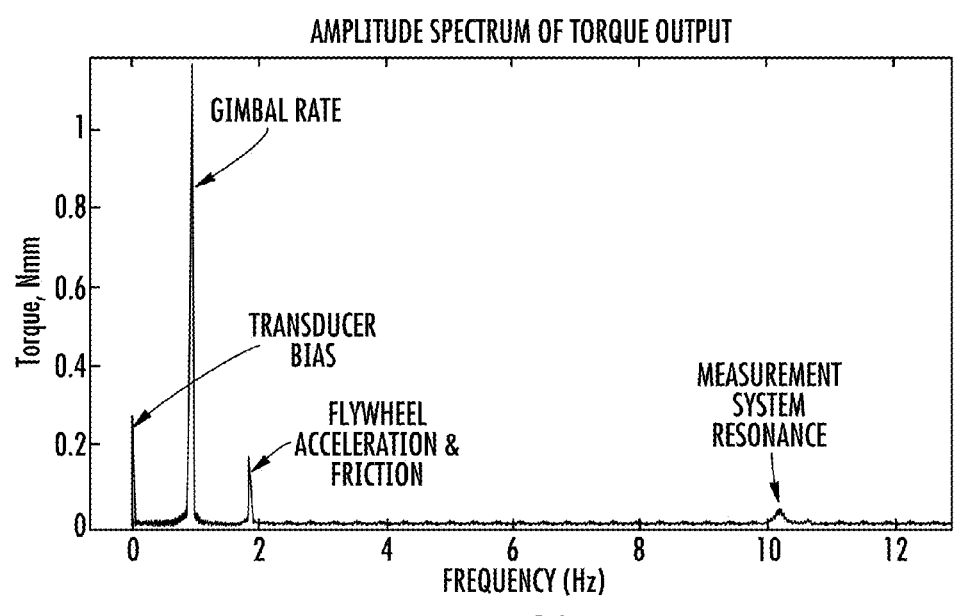

FIG. 20 shows the FFT of the torque output shown in FIG. 19. The peaks in the plot have been labeled in the figure. The first peak is shown at 0 Hz and this is due to the bias torque on the transducer. The second peak occurs at the frequency of the gyroscopic torque which is equal to the gimbal speed of 1 Hz. The third peak occurs at a frequency about twice the gimbal speed. This is due to the flywheel acceleration and friction torque which is along the axis of the flywheel and lines up with the transducer measurement axis twice in one revolution of the gimbal. The fourth peak occurs at about 10 Hz which is the mechanical resonance of the measurement system.

Embodiments of the present invention may provide several advantages. For example, the systems and methods may provide more effective techniques for assessing the performance of an actuator of an ACS, for both small and large satellites. The systems and methods may provide such assessment in a simplified, inexpensive, and easy to use manner. Moreover, the disclosed systems and methods enable assessment of the actuator without requiring motion of the support bracket assembly, thereby overcoming many of the shortcomings of conventional test beds. The actuator is also capable of operating about its full range of motion. In addition, the systems and methods may be adaptable for use with different actuators (e.g., a CMG) and for one or multi-axis torque measurements. The systems and methods may also be employed in a variety of environments.

System Design: Laser Sensor Embodiment

As noted herein, embodiments of the present invention are directed to a system and method for assessing the performance of an ACS actuator such as a CMG for small satellites (e.g., pico and nano-satellites). The performance of the actuator is sensed, such as through the output torque using a testing system, and then used in simulation of the spacecraft dynamic motion.

In another embodiment, a testing system is configured to use one or more laser sensors to measure displacement of the gimbal(s) surrounding and/or supporting the CMG to thereby determine output torque of the relative axes. The system uses one or more high precision laser displacement sensors. One benefit of such an embodiment is that the laser sensors have a larger effective dynamic range compared to the strain gauge based sensors or transducers described in other embodiments herein.

Similar to systems described above, torque transducer shafts may be attached to gimbals and/or a support bracket assembly surrounding the CMG (e.g., transducer shaft 80 shown in FIG. 6). In comparison to embodiments described above (e.g., FIGS. 6-7), the torque transducer shaft coupled to a gimbal (e.g., the pitch axis gimbal 74 shown in FIG. 6) may be replaced with a stiffer shaft and calibrated. When the CMG outputs torque, the gimbal undergoes small angular deflection depending on the stiffness of the calibrated shaft. The laser displacement sensor measures this deflection, and since the stiffness of the shaft is known, the output torque can be correlated with the displacement of the gimbal. For example, the following set of equations illustrates the relationship between the torque and the displacement of the gimbal.

Nomenclature:
$\delta$ Displacement of the gimbal
$g$ Voltage to displacement gain
$r$ Length of the gimbal arm
$k_t$ Stiffness of the transducer shaft
$\theta$ Angular displacement of the gimbal
$\tau$ Torque on the gimbal Equations:

$$\tau = k_t \theta \qquad (6)$$

$$\delta = r \sin\theta \approx r\theta \qquad (7)$$

$$\delta = gV \qquad (8)$$

$$\tau = \frac{k_t g V}{r} \qquad (9)$$

The system design discussed below is for a single axis version with a built in capacity to be extended to a two axis version. The same concept can be extended to design two or more axis versions. Thus, although the discussion below relates to a single axis system, the system may be modified for use with a plurality of axes in alternative embodiments.

Figure 22:
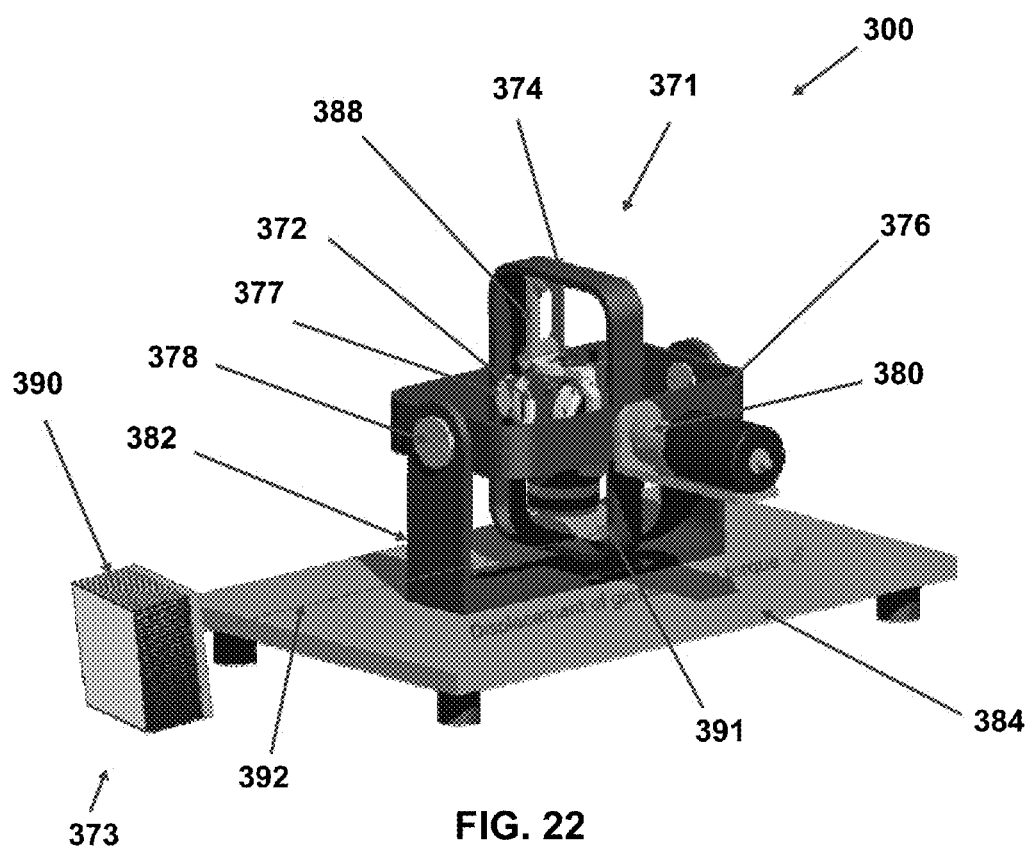
FIG. 22 depicts a system for assessing performance of a CMG according to another embodiment of the present invention.

FIG. 22 shows a system 300 with a CMG 372 mounted thereon according to one embodiment of the present invention. The system 300 generally includes a support bracket assembly 371 and at least one sensor assembly 373. The support bracket assembly 371 includes a pitch axis gimbal 374 pivotally coupled to a roll axis gimbal 376. The pitch axis gimbal 374 is configured to pivot with respect to the roll axis gimbal 376. The pitch axis gimbal 374 is aligned in a generally vertical plane, while the roll axis gimbal 376 is aligned in a generally horizontal plane. The gimbals 374, 376 may be made of various materials, such as aluminum, and are designed to have very low inertia. The pitch axis gimbal 374 is mounted inside the roll axis gimbal 376, wherein the gimbals may be rectangular or other shapes with respective openings for accommodating and supporting the CMG 372 therein. The pitch axis gimbal 374 comprises an actuator mount bracket 388 to which the CMG 372 can be attached, thereby facilitating transfer of the output torque of the CMG 372 to the support bracket assembly 371. It is of note that the CMG 372 is capable of its full range of motion due to its positioning within the support bracket assembly. Thus, the system 300 is configured for testing the CMG 372 over its entire range of motion.

The pitch axis gimbal 374 and roll axis gimbal 376 may be coupled via a pair of inner gimbal pivots 377 extending along a pitch axis of the support bracket assembly 371. In the illustrated embodiment, the inner gimbal pivots 377 may be small stainless steel shafts coupled to the pitch axis gimbal 374. The shafts may be located on small low friction bearings (e.g., a friction coefficient<0.01) mounted on the roll axis gimbal 376. One of the shafts, or transducer coupler shaft 380, may be longer than the other and projects through the roll axis gimbal 376.

The roll axis gimbal 376 is mounted on a pair of outer gimbal pivots 378 along a roll axis of the support bracket assembly 371 in a similar manner as the inner gimbal pivots 377. In this regard, the roll axis gimbal 376 is coupled to a support or U-shaped bracket 382 via the inner gimbal pivots 378. However, the support bracket 382 is stationary and is fixed to a rigid isolated platform 384. The rotation of the roll axis gimbal 376 about pivots 378 may be locked using fasteners for a single axis measurement about the pitch axis. This locking can be removed to extend the testing to two-axis as explained in further detail below.

The sensor assembly 373 includes a laser sensor 390. The laser sensor 390 may be positioned so as to point directly (e.g., along line 392) at a spot 391 on the pitch axis gimbal 374. In such a manner, the laser sensor 390 may measure displacement of the pitch axis gimbal 374 as the pitch axis gimbal 374 pivots about the pitch axis. Then, as noted above, the displacement measured can be used to determine the torque generated about the pitch axis. Thus, any torque generated about the pitch axis is measured by the laser sensor 390 while the support bracket assembly 371 remains substantially motionless.

In some embodiments, a second laser sensor may be positioned so as to measure torque for of one or more other axes, such as the roll axis. In such an embodiment, the second laser sensor may be positioned to measure displacement of another gimbal, such as the roll axis gimbal 376. Furthermore, in embodiments of a three axis system, a third sensor can be used to measure displacement of a yaw axis gimbal (e.g., yaw axis gimbal 288 shown in FIG. 21) and, thus, measure torque about the yaw axis.

Figure 23:
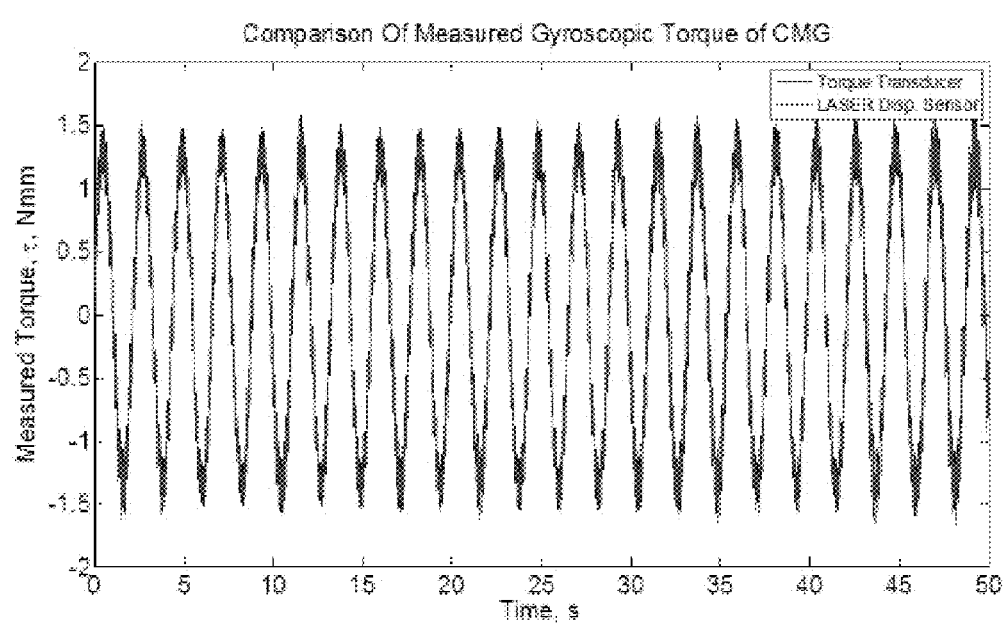
FIG. 23 shows test results of the system shown in FIG. 22.

A plot comparing the output torque of the strain gauge based torque transducer (shown in FIG. 6) and the laser sensor (shown in FIG. 22) when the CMG is turned on is shown in FIG. 23. As can be seen in FIG. 23, the strain gauge based torque transducer and the laser sensor generate similar results for measuring output torque. The laser sensor has a very high dynamic range of $1.5 \times 10^6$, which is defined as the ratio between the largest measurement and smallest measurement the sensor is capable of reading. As such, the laser sensor has the ability to capture both small and large changes in the displacement of the target gimbal (e.g., the pitch axis gimbal 374). Initial results have also shown the laser sensor to be less prone to noise than the transducer-based testing system. Another benefit of use of the laser sensor is that a single set of laser sensors can be used for different classes of torque measurement by simply changing the calibrated transducer shaft. Further, the laser sensor permits un-attenuated measurements in the required bandwidth. The high frequency dynamics can now be filtered out before it is used by a spacecraft dynamic model. As such, the development of a test bed may be based on the use of these high performance sensors.

Attitude Determination Test Bed

In some embodiments, the testing system may comprise an attitude determination test bed (see e.g., the test bed shown in FIG. 1(b)). Indeed, in some embodiments, the sensors of the testing system may be used to measure precise output of the CMG (e.g., torque). This output can be inputted into a dynamic model of a spacecraft to propagate its states (e.g., attitude, position, velocity, and angular velocity). Further, the orbital disturbances based on the states of the spacecraft may also be computed and input into the dynamic model. Indeed, in some embodiments, the attitude sensors (e.g., the torque sensor(s) and/or laser sensor(s) described above) of the testing system may be used to provide measured attitude information for the dynamic model. Additionally, in some embodiments, the testing system may be placed inside a thermal vacuum chamber to simulate a space-like environment that is controlled by a thermal model using the spacecraft orbital position and attitude. Moreover, since in some embodiments there is no limitation of physical motion of the testing system, entire mission operation models may be performed continuously, and realistic simulation can be achieved.

In such a manner, the attitude determination test bed may be configured to update a controlled dynamic environment being observed. The updates may be based on the orbital position and the attitude of the spacecraft, which are derived from the orbital model and attitude model (e.g., example testing systems described herein) respectively. Examples include star field simulators and magnetic field simulators.

Figure 24:
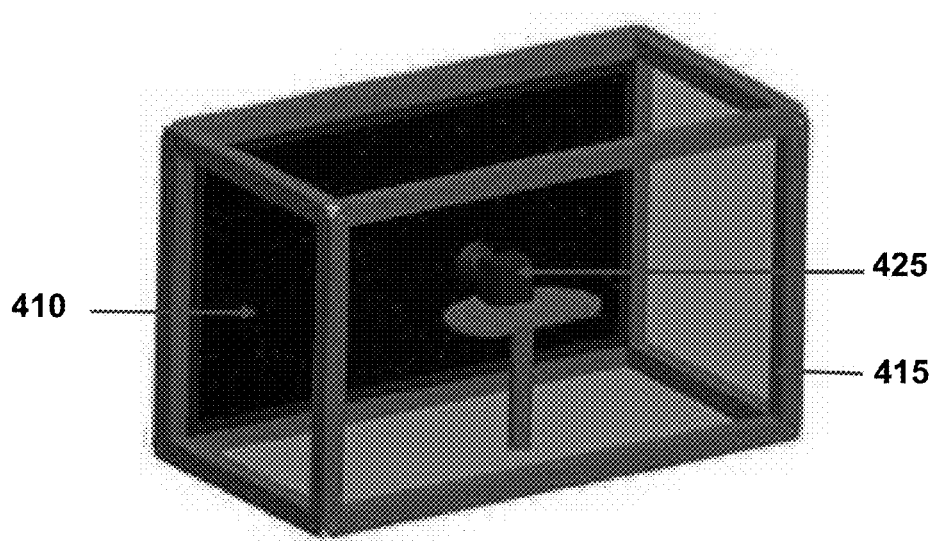
FIG. 24 illustrates a star field simulator according to one embodiment of the present invention.
Figure 25:
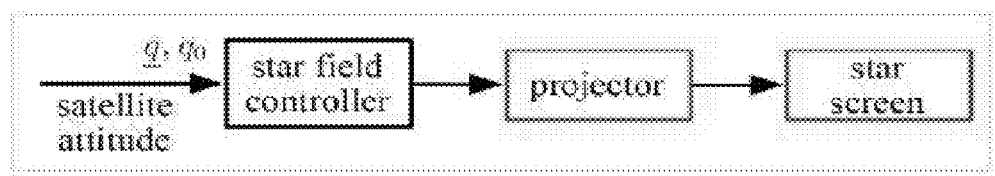
FIG. 25 illustrates a flow chart of a method for updating the star field simulator shown in FIG. 24.

With respect to a star field simulator illustrated in FIG. 24, one approach is to project a star map on a screen 410 within a shrouded enclosure 415, which the star tracker 425 will observe. The star map is dynamically updated based on the attitude of the satellite in the simulation, as shown in FIG. 25. Multiple commercial products, such as may be provided by Presagis and Mechdyne, are available for rendering the star maps. Multiple star trackers based on the geometry of the spacecraft and the relative orientation of the star sensors can be included in the simulator. The output of the star Sensor, which is the estimated attitude quaternion, is used as the feedback for the attitude control algorithms.

Figure 26:
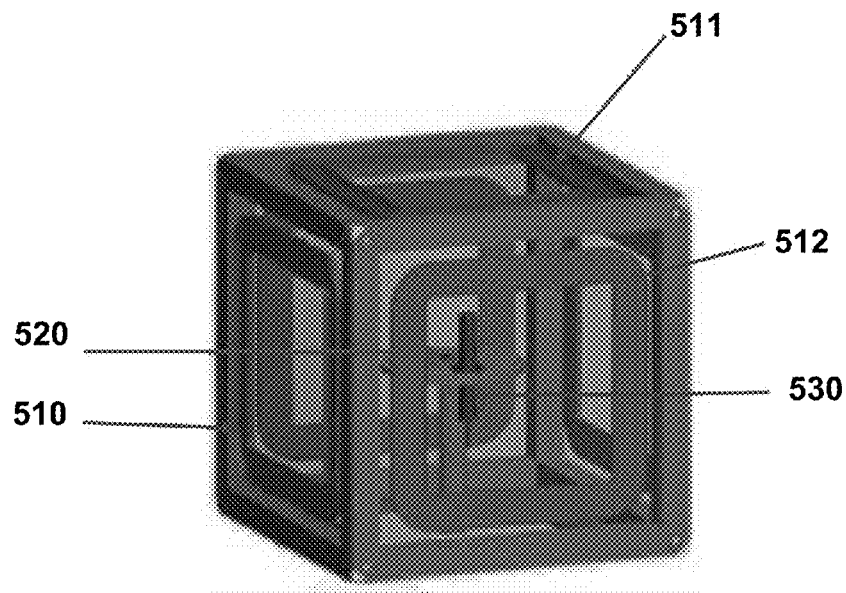
FIG. 26 illustrates a magnetic field simulator according to one embodiment of the present invention.
Figure 27:
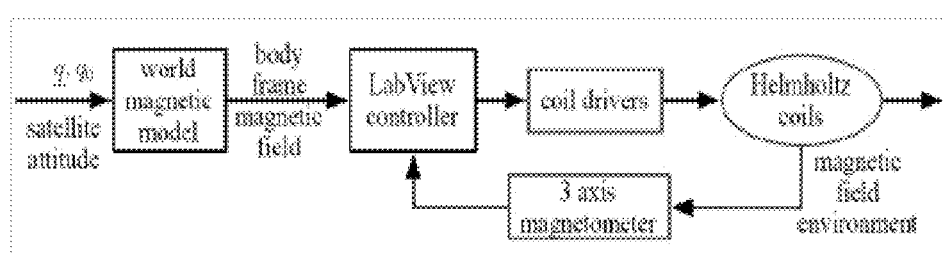
FIG. 27 illustrates a flow chart of a method for updating the magnetic field simulator shown in FIG. 26.

With respect to one embodiment of a magnetic field simulator shown in FIG. 26, the magnetic field simulator includes three sets of Helmholtz coils 510, 511, 512 in a chamber, providing three-axis control. The chamber size may be only large enough to accommodate flight magnetometer hardware 520 for the simulation. The Helmholtz coils 510, 511, 512 may provide a near uniform magnetic field in the center of the chamber, where the flight hardware is located. The magnetic field is measured with a lab magnetometer 530 for feedback, and controlled with a controller (e.g., a LabView based controller), such as shown in FIG. 27. As the simulated attitude state of the satellite evolves in the simulation, the Helmholtz coils 510, 511, 512 are driven to produce a magnetic field in the body frame of the flight magnetometer, based on the World Magnetic Model (WMM). This arrangement of Helmholtz coils 510, 511, 512 may also permit the cancellation of constant or slowly varying spurious fields in the laboratory. Similarly, other simulators for various sensors can be built and their output used in a data fusion algorithm to estimate the attitude of the spacecraft used for attitude control.

As discussed above, some embodiments of the present invention include testing systems for assessing the performance of an attitude control system for small satellites. Such testing systems may provide advantages over other testing systems (e.g., air bearing simulators). One advantage of example testing systems described herein is that many disturbance torques are irrelevant. For example, bias torques and gravity gradient torques can be compensated and a mass balancing system can be avoided. Further, aerodynamic torques are eliminated, as some example testing systems can be placed in a thermal-vacuum chamber.

Another advantage to example testing systems described herein includes unlimited motion capability within the dynamic model since the testing system remains substantially motionless. Along these lines, example testing systems enable more realistic simulations that can account for additional key elements, such as solar drag, atmospheric drag, third-body effect, gravity gradients, etc.

An additional advantage is that there is no need for an on-board attitude feedback device with the testing system, according to embodiments of the present invention. Moreover, the testing system has the capability to test flight attitude determination hardware in conjunction with the attitude control test facility, thereby enabling an integrated attitude determination and control test, which is not possible on air bearing simulators.

Further advantages of example testing systems described herein include increased scalability and customization for a particular model. Along these lines, setup time for testing is decreased, as the testing system is easier to adapt to different models. For example, using the setup for a spacecraft with different mass properties but the same actuators involves simply changing the parameters in the dynamic model.

Finally, as noted herein, a distinct benefit of embodiments described herein includes the ability to more accurately test performance of small satellites. Indeed, small satellites are prone to minute disturbances, and the example testing systems described herein are designed to measure these minute disturbances. Moreover, issues associated with miniature mass balancing systems and attitude feedback devices are irrelevant.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended inventive concepts. Although specific terms are employed herein, they are used in a generic and descriptive sense only and not for purposes of limitation.

REFERENCES

1. J. L. Schwartz, M. A. Peck, and C. D. Hall, "*Historical Review of Air-Bearing Spacecraft Simulators*," Journal of Guidance, Control and Dynamics, Vol. 26, No. 4, 2003, pp. 513-522
2. Jung, D. and Tsiotras, P., "*A 3-DoF Experimental Test-Bed for Integrated Attitude Dynamics and Control Research*," AIAA Guidance, Navigation, and Control Conference, Austin, Tex., 2003, AIAA 2003-5331.
3. Kim, J. and Agrawal, B "*Automatic mass Balancing of Air-Bearing based Three-Axis Rotational Spacecraft Simulator*," AIAA Journal of Guidance, Control, and Dynamics, Vol. 32, No. 3, May-June 2009, pp. 1005-1017
4. Nagabhushan, V., "*Development Of Control Moment Gyroscopes For Attitude Control of Small Satellites*", Master's Thesis, University of Florida, 2009
5. Kurukowa, H., "*A Geometric Study of Control Moment Gyroscopes*", PhD Thesis, University of Tokyo, 1998

That which is claimed:

1. A system for assessing the performance of an actuator of an attitude control system ("ACS") comprising:
    a support bracket assembly coupled to an actuator of an ACS, the actuator configured to generate an output torque, wherein the support bracket assembly comprises a pitch axis gimbal coupled to the actuator and a roll axis gimbal pivotably coupled to the pitch axis gimbal; and
    at least one sensor assembly comprising a sensor configured to measure the output torque about at least one axis of the support bracket assembly while the support bracket assembly remains substantially motionless, wherein the at least one sensor comprises a laser sensor configured to measure displacement of the pitch axis gimbal, wherein the displacement of the pitch axis gimbal is representative of the output torque on the pitch axis gimbal.

2. The system of claim 1, further comprising a data acquisition system in communication with the at least one sensor assembly and configured to receive the measured output torque.

3. The system of claim 1, wherein the pitch axis gimbal and the roll axis gimbal extend in perpendicular planes with respect to one another.

4. The system of claim 1, wherein the pitch axis gimbal is mounted internally with respect to the roll axis gimbal.

5. The system of claim 1, wherein the at least one sensor assembly further comprises a second laser sensor configured to measure displacement of the roll axis gimbal, wherein the displacement of the roll axis gimbal is representative of the output torque on the roll axis gimbal.

6. The system of claim 1, wherein the at least one sensor assembly is configured to measure the output torque about a plurality of axes of the support bracket assembly while the support bracket assembly remains substantially motionless.

7. The system of claim 1, wherein the actuator comprises a control moment gyroscope (CMG).

8. The system of claim 1, wherein the support bracket assembly is configured to deflect less than about 30 arc minutes while the sensor measures the output torque about the at least one axis.

9. A method for assessing the performance of an actuator of an attitude control system ("ACS") comprising:
    coupling an actuator of an ACS to a support bracket assembly;
    generating an output torque with the actuator; and
    measuring the output torque about at least one axis of the support bracket assembly by measuring displacement of the portion of the support bracket assembly with at least one laser sensor while the support bracket assembly remains substantially motionless, wherein the displacement of the portion of the support bracket assembly is representative of the output torque about the at least one axis of the support bracket assembly.

10. The method of claim 9, wherein measuring comprises measuring the output torque about a plurality of axes of the support bracket assembly.

11. The method of claim 9, wherein the actuator comprises a control moment gyroscope (CMG).

12. The method of claim 9, wherein measuring comprises measuring the output torque about the at least one axis while the support bracket assembly deflects less than about 30 arc minutes.

13. The system of claim 1, wherein the support bracket assembly further comprises a shaft coupled to the pitch axis gimbal, wherein the shaft is calibrated to define a stiffness that correlates with a degree of the displacement of the pitch axis gimbal.

14. The system of claim 13, further comprising a data acquisition system in communication with the at least one sensor assembly and configured to receive the measured displacement, wherein the data acquisition system is configured to determine the output torque based at least on the stiffness of the shaft and the measured displacement of the pitch axis gimbal.

15. The method of claim 9, wherein the support bracket assembly comprises a shaft coupled to a gimbal of the at least one axis, wherein the actuator is coupled to the gimbal, and wherein the shaft is calibrated to define a stiffness that correlates with a degree of the displacement of the gimbal.

16. The method of claim 15, wherein measuring the output torque comprises determining, based at least on the stiffness of the shaft and the measured displacement of the pitch axis gimbal, the output torque with a data acquisition system in communication with the at least one laser sensor.

\* \* \* \* \*